United States Patent
Peng et al.

(12) 
(10) Patent No.: US 10,614,764 B2
(45) Date of Patent: Apr. 7, 2020

(54) ZONE-BASED DISPLAY DATA PROCESSING AND TRANSMISSION

(71) Applicant: SHANGHAI YUNYINGGU TECHNOLOGY CO., LTD., Shanghai (CN)

(72) Inventors: Yu-Hsun Peng, Hsinchu (TW); Jing Gu, Shanghai (CN); Shih-Wei Tseng, Hsinchu (TW)

(73) Assignee: Shanghai Yunyinggu Technology Co., Ltd., Shanghai (CN)

( * ) Notice: Subject to any disclaimer, the term of this patent is extended or adjusted under 35 U.S.C. 154(b) by 0 days.

(21) Appl. No.: 16/373,882

(22) Filed: Apr. 3, 2019

(65) Prior Publication Data
US 2019/0237021 A1    Aug. 1, 2019

Related U.S. Application Data

(63) Continuation of application No. PCT/CN2016/108175, filed on Dec. 1, 2016.

(51) Int. Cl.
*G09G 3/3258* (2016.01)
*G06F 1/3234* (2019.01)
(Continued)

(52) U.S. Cl.
CPC ......... *G09G 3/3258* (2013.01); *G06F 1/3265* (2013.01); *G06F 3/013* (2013.01);
(Continued)

(58) Field of Classification Search
CPC ..... G09G 3/3258; G06F 1/3265; G06F 3/013; G06G 5/391; G06G 5/395; Y02D 10/153
See application file for complete search history.

(56) References Cited

U.S. PATENT DOCUMENTS

| | | | |
|---|---|---|---|
| 2007/0088714 A1* | 4/2007 | Edwards | G06F 16/958 |
| 2007/0091030 A1* | 4/2007 | Drevillon | G09G 3/3233 345/76 |

(Continued)

FOREIGN PATENT DOCUMENTS

| | | |
|---|---|---|
| CN | 104115100 A | 10/2014 |
| CN | 105431763 A | 3/2016 |

(Continued)

OTHER PUBLICATIONS

SIPO International Search Report dated Aug. 24, 2017 in corresponding PCT Application No. PCT/CN2016/108175, 3 pages.
(Continued)

*Primary Examiner* — Sejoon Ahn
(74) *Attorney, Agent, or Firm* — Bayes PLLC

(57) ABSTRACT

An apparatus includes a display panel and one or more drivers operatively coupled to the display panel. The display panel includes an array of pixels divided into at least a first zone and a second zone, each of which is associated with a plurality of display attributes. The drivers are configured to receive control signals, and drive the array of pixels based, at least in part, on the control signals so that a first value of at least one of the plurality of display attributes associated with the first zone is different from a second value of the at least one of the plurality of display attributes associated with the second zone.

28 Claims, 27 Drawing Sheets

(51) Int. Cl.
  *G06F 3/01*    (2006.01)
  *G09G 5/391*   (2006.01)
  *G09G 5/395*   (2006.01)

(52) U.S. Cl.
  CPC ............ *G09G 5/391* (2013.01); *G09G 5/395* (2013.01); *Y02D 10/153* (2018.01)

(56) References Cited

U.S. PATENT DOCUMENTS

| | | | |
|---|---|---|---|
| 2007/0140593 A1* | 6/2007 | Wang | G09G 5/377 |
| | | | 382/298 |
| 2007/0171188 A1* | 7/2007 | Waites | G06F 1/3203 |
| | | | 345/156 |
| 2007/0177103 A1* | 8/2007 | Migliaccio | A61B 3/113 |
| | | | 351/206 |
| 2007/0192722 A1* | 8/2007 | Kokubo | G06F 1/1626 |
| | | | 715/771 |
| 2016/0267716 A1 | 9/2016 | Patel | |

FOREIGN PATENT DOCUMENTS

| | | |
|---|---|---|
| CN | 106101533 A | 11/2016 |
| WO | 2016171404 A1 | 10/2016 |

OTHER PUBLICATIONS

Written Opinion of the International Searching Authority, dated Aug. 24, 2017, directed to International Patent Application No. PCT/CN2016/108175, 4 pages.

* cited by examiner

ZONE-BASED DISPLAY DATA PROCESSING AND TRANSMISSION

CROSS REFERENCE TO RELATED APPLICATION

This application is continuation of International Application No. PCT/CN2016/108175, filed on Dec. 1, 2016, entitled "ZONE-BASED DISPLAY DATA PROCESSING AND TRANSMISSION," which is hereby incorporated by reference in its entirety.

BACKGROUND

The disclosure relates generally to display technologies, and more particularly, to display data processing and transmission.

Emerging applications of display technologies, such as virtual reality (VR) and augmented reality (AR), oftentimes require high resolution, high frame rate, and low latency in order to provide immersion and prevent cybersickness. Consequently, high data bandwidth at the display interface, e.g., between the graphics processor and the driver integrated circuit (IC) of the displays, becomes a bottleneck of the advancement of next-generation display applications. For example, the data bandwidth at the display interface of traditional display systems may need to reach 138G bps in an ideal situation for VR application, e.g., retina display at 120 frames per second (fps), which goes beyond the capabilities of most of the known display interfaces.

SUMMARY

The disclosure relates generally to display technologies, and more particularly, to display data processing and transmission.

In one example, a system for display includes a display, a processor, and control logic operatively coupled to the display and the processor. The display includes an array of pixels divided into a plurality of zones. The processor includes a graphics pipeline, a tracking module, a pre-processing module, and a data transmitter. The graphics pipeline is configured to, for each of the plurality of zones, generate a set of original display data in each frame. The tracking module is configured to determine a gazing zone of the plurality of zones based, at least in part, on a point-of-gaze of a user. The pre-processing module is configured to, for each of the plurality of zones other than the gazing zone, compress the corresponding set of original display data in each frame to reduce an amount of data in the set of original display data in each frame. The data transmitter is configured to transmit, in each frame, a stream of display data comprising the one or more sets of compressed display data for each zone other than the gazing zone. The control logic is configured to provide control signals for driving the display and includes a data receiver and a post-processing module. The data receiver is configured to receive from the data transmitter, in each frame, the stream of display data. The post-processing module is configured to, for each zone other than the gazing zone, recover the corresponding set of compressed display data so as to, in each frame, render the pixels in each zone other than the gazing zone based, at least in part, on the corresponding set of recovered display data.

In another example, an apparatus includes a display and control logic operatively coupled to the display. The display includes an array of pixels divided into a plurality of zones. The control logic is configured to provide control signals for driving the display and includes a data receiver and a post-processing module. The data receiver is configured to receive, in each frame, a stream of display data comprising one or more sets of compressed display data for each of the plurality of zones other than a gazing zone. The gazing zone is determined based, at least in part, on a point-of-gaze of a user. Each set of compressed display data is generated by a processor by compressing a set of original display data for the corresponding zone other than the gazing zone. The post-processing module configured to, for each zone other than the gazing zone, recover the corresponding set of compressed display data so as to, in each frame, render the pixels in each zone other than the gazing zone based, at least in part, on the corresponding set of recovered display data.

In still another example, an apparatus includes a graphics pipeline, a tracking module, a pre-processing module, and a data transmitter. The graphics pipeline is configured to, for each of a plurality of zones divided from an array of pixels on a display, generate a set of original display data in each frame. The tracking module is configured to determine a gazing zone of the plurality of zones based, at least in part, on a point-of-gaze of a user. The pre-processing module is configured to, for each of the plurality of zones other than the gazing zone, compress the corresponding set of original display data in each frame to reduce an amount of data in the set of original display data in each frame. The data transmitter is configured to transmit, to control logic operatively coupled to the display, in each frame, a stream of display data comprising the one or more sets of compressed display data for each zone other than the gazing zone.

In yet another example, a system for display includes a display, a processor, and control logic operatively coupled to the display and the processor. The display includes an array of pixels divided into a plurality of zones. The processor includes a graphics pipeline, a pre-processing module, and a data transmitter. The graphics pipeline is configured to, for each of the plurality of zones, generate a set of display data at a normal frame rate. The pre-processing module is configured to, for each of the plurality of zones other than a normal zone, set a reduced frame rate lower than the normal frame rate at which the corresponding set of display data is generated. The data transmitter is configured to transmit a stream of display data comprising the one or more sets of display data for each zone other than the normal zone, wherein each set of display data for the zone other than the normal zone is transmitted at the corresponding reduced frame rate. The control logic is configured to provide control signals for driving the display and includes a data receiver and a post-processing module. The data receiver is configured to receive, from the data transmitter, the stream of display data. The post-processing module is configured to generate the control signals based, at least in part, on the received stream of display data, wherein the control signals cause the pixels in each zone other than the normal zone to be refreshed based, at least in part, on the corresponding reduced frame rate.

In yet another example, an apparatus includes a display and control logic operatively coupled to the display. The display includes an array of pixels divided into a plurality of zones. The control logic is configured to provide control signals for driving the display and includes a data receiver and a post-processing module. The data receiver is configured to receive, from the data transmitter, a stream of display data comprising one or more sets of display data for each of the plurality of zones other than a normal zone. Each set of display data for the zone other than the normal zone is transmitted at a corresponding reduced frame rate lower than a normal frame rate at which the corresponding set of display data is generated by a processor. The post-processing module is configured to generate the control signals based, at least in part, on the received stream of display data. The control signals cause the pixels in each zone other than the normal zone to be refreshed based, at least in part, on the corresponding reduced frame rate.

In yet another example, an apparatus includes a graphics pipeline, a pre-processing module, and a data transmitter. The graphics pipeline is configured to, for each of a plurality of zones divided from an array of pixels on a display, generate a set of display data at a normal frame rate. The pre-processing module is configured to, for each of the plurality of zones other than a normal zone, set a reduced frame rate lower than the normal frame rate at which the corresponding set of display data is generated. The data transmitter is configured to transmit, to control logic operatively coupled to the display, a stream of display data comprising the one or more sets of display data for each zone other than the normal zone. Each set of display data for the zone other than the normal zone is transmitted at the corresponding reduced frame rate.

In yet another example, a system for display includes a display, a processor, and control logic operatively coupled to the display and the processor. The display includes an array of pixels divided into a plurality of zones. The processor includes a graphics pipeline, a tracking module, a pre-processing module, and a data transmitter. The graphics pipeline is configured to, for each of the plurality of zones, generate a set of original display data in each frame at a normal frame rate. The tracking module is configured to determine a gazing zone of the plurality of zones based, at least in part, on a point-of-gaze of a user. The pre-processing module is configured to, for each of the plurality of zones other than the gazing zone, compress the corresponding set of original display data in each frame to reduce an amount of data in the set of original display data in each frame, and set a reduced frame rate lower than the normal frame rate at which the corresponding set of original display data is generated. The data transmitter is configured to transmit a stream of display data comprising, in each frame, the one or more sets of compressed display data for each zone other than the gazing zone. Each set of compressed display data for the zone other than the gazing zone is transmitted at the corresponding reduced frame rate. The control logic is configured to provide control signals for driving the display and includes a data receiver and a post-processing module. The data receiver is configured to receive, from the data transmitter, the stream of display data. The post-processing module configured to, for each zone other than the gazing zone, recover the corresponding set of compressed display data so as to, in each frame, render the pixels in each zone other than the gazing zone based, at least in part, on the corresponding set of recovered display data. The post-processing module is also configured to generate the control signals based, at least in part, on the received stream of display data, wherein the control signals cause the pixels in each zone other than the gazing zone to be refreshed based, at least in part, on the corresponding reduced frame rate.

In yet another example, an apparatus includes a display and control logic operatively coupled to the display. The display includes an array of pixels divided into a plurality of zones. The control logic is configured to provide control signals for driving the display and includes a data receiver and a post-processing module. The data receiver is configured to receive a stream of display data. The stream of display data comprises, in each frame, one or more sets of compressed display data for each of the plurality of zones other than a gazing zone. The gazing zone is determined based, at least in part, on a point-of-gaze of a user. Each set of compressed display data is generated by a processor by compressing a set of original display data for the corresponding zone other than the gazing zone. Each set of compressed display data for the zone other than the gazing zone is transmitted at a corresponding reduced frame rate lower than a normal frame rate at which the corresponding set of original display data is generated by the processor. The post-processing module is configured to, for each zone other than the gazing zone, recover the corresponding set of compressed display data so as to, in each frame, render the pixels in each zone other than the gazing zone based, at least in part, on the corresponding set of recovered display data. The post-processing module is also configured to generate the control signals based, at least in part, on the received stream of display data, wherein the control signals cause the pixels in each zone other than the gazing zone to be refreshed based, at least in part, on the corresponding reduced frame rate.

In yet another example, an apparatus includes a graphics pipeline, a tracking module, a pre-processing module, and a data transmitter. The graphics pipeline is configured to, for each of a plurality of zones divided from an array of pixels on a display, generate a set of original display data in each frame at a normal frame rate. The tracking module is configured to determine a gazing zone of the plurality of zones based, at least in part, on a point-of-gaze of a user. The pre-processing module is configured to, for each of the plurality of zones other than the gazing zone, compress the corresponding set of original display data in each frame to reduce an amount of data in the set of original display data in each frame, and set a reduced frame rate lower than the normal frame rate at which the corresponding set of original display data is generated. The data transmitter is configured to transmit, to control logic operatively coupled to the display, a stream of display data comprising, in each frame, the one or more sets of compressed display data for each zone other than the gazing zone. Each set of compressed display data for the zone other than the gazing zone is transmitted at the corresponding reduced frame rate.

In yet another example, an apparatus for display includes a display panel and one or more drivers operatively coupled to the display panel. The display panel includes an array of pixels divided into at least a first zone and a second zone. Each of the first and second zones is associated with a plurality of display attributes. The drivers are configured to receive control signals, and drive the array of pixels based, at least in part, on the control signals so that a first value of at least one of the plurality of display attributes associated with the first zone is different from a second value of the at least one of the plurality of display attributes associated with the second zone.

In a different example, a method of providing display data is provided. A set of original display data is generated in each frame for each of a plurality of zones divided from an array of pixels on a display. A gazing zone of the plurality of zones is determined based, at least in part, on a point-of-gaze of a user. For each of the plurality of zones other than the gazing zone, the corresponding set of original display data is compressed in each frame to reduce an amount of data in the set of original display data in each frame. A stream of display data comprising the one or more sets of compressed display data for each zone other than the gazing zone is transmitted in each frame.

In another example, a method for providing control signals for driving a display having an array of pixels divided into a plurality of zones is provided. A stream of display data comprising one or more sets of compressed display data for each of the plurality of zones other than a gazing zone is received in each frame. The gazing zone is determined based, at least in part, on a point-of-gaze of a user. Each set of compressed display data is generated by a processor by compressing a set of original display data for the corresponding zone other than the gazing zone. For each zone other than the gazing zone, the corresponding set of compressed display data is recovered so as to, in each frame, render the pixels in each zone other than the gazing zone based, at least in part, on the corresponding set of recovered display data.

In still another example, a method for providing display data is provided. A set of display data is generated at a normal frame rate for each of a plurality of zones divided from an array of pixels on a display. For each of the plurality of zones other than a normal zone, a reduced frame rate is set lower than the normal frame rate at which the corresponding set of display data is generated. A stream of display data comprising the one or more sets of display data for each zone other than the normal zone is transmitted. Each set of display data for the zone other than the normal zone is transmitted at the corresponding reduced frame rate.

In yet another example, a method for providing control signals for driving a display having an array of pixels divided into a plurality of zones is provided. A stream of display data comprising one or more sets of display data for each of the plurality of zones other than a normal zone is received. Each set of display data for the zone other than the normal zone is transmitted at a corresponding reduced frame rate lower than a normal frame rate at which the corresponding set of display data is generated by a processor.

In yet another example, a method for providing display data is provided. A set of original display data is generated in each frame at a normal frame rate for each of a plurality of zones divided from an array of pixels on a display. A gazing zone of the plurality of zones is determined based, at least in part, on a point-of-gaze of a user. For each of the plurality of zones other than the gazing zone, the corresponding set of original display data is compressed in each frame to reduce an amount of data in the set of original display data in each frame, and a reduced frame rate is set lower than the normal frame rate at which the corresponding set of original display data is generated. A stream of display data comprising, in each frame, the one or more sets of compressed display data for each zone other than the gazing zone is transmitted. Each set of compressed display data for the zone other than the gazing zone is transmitted at the corresponding reduced frame rate.

In yet another example, a method for providing control signals for driving a display having an array of pixels divided into a plurality of zones is provided. A stream of display data is received. The stream of display data comprises, in each frame, one or more sets of compressed display data for each of the plurality of zones other than a gazing zone. The gazing zone is determined based, at least in part, on a point-of-gaze of a user. Each set of compressed display data is generated by a processor by compressing a set of original display data for the corresponding zone other than the gazing zone. Each set of compressed display data for the zone other than the gazing zone is transmitted at a corresponding reduced frame rate lower than a normal frame rate at which the corresponding set of original display data is generated by the processor. For each zone other than the gazing zone, the corresponding set of compressed display data is recovered so as to, in each frame, render the pixels in each zone other than the gazing zone based, at least in part, on the corresponding set of recovered display data. The control signals are generated based, at least in part, on the received stream of display data. The control signals cause the pixels in each zone other than the gazing zone to be refreshed based, at least in part, on the corresponding reduced frame rate.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
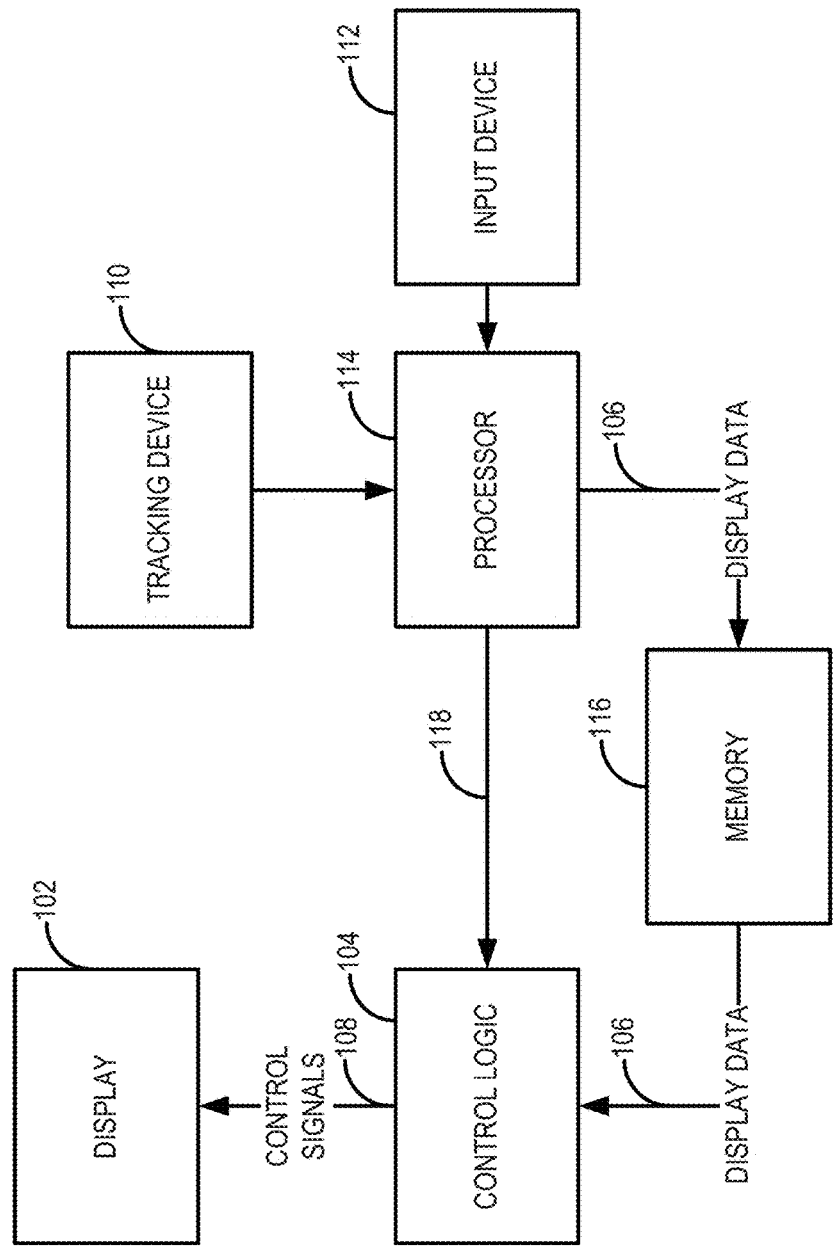
FIG. 1 is a block diagram illustrating an apparatus including a display and control logic in accordance with an embodiment.

In the following detailed description, numerous specific details are set forth by way of examples in order to provide a thorough understanding of the relevant disclosures. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As will be disclosed in detail below, among other novel features, the display system, apparatus, and method disclosed herein can reduce the average data bandwidth at the display interface by zone-based display data processing and transmission. The present disclosure recognizes that human eyes usually have high resolution only on images in the field of view (FOV) of about 20 to 50 degrees in front of the users and tend to focus on images in the same FOV when the users turn their heads. That is, part of the display area of a display device may play a more important role in yield high apparent display resolution than other parts of the display area. In some embodiments, eye-tracking may be used to dynamically detect a point-of-gaze of the user of a display device and to reduce the amount of display data of the regions other than the point-of-gaze to be transmitted via the display interface. In some embodiments, display data of the display zone outside the 50-degree FOV may be transmitted via the display interface and updated on the display panel at a reduced frame rate. In some embodiments, motion detection may be used to reduce the frame rate for transmitting and updating the display data of the entire display area when the user is at a stationary state.

Moreover, the display system, apparatus, and method disclosed herein can provide flexibilities to the control logic (e.g., driver IC) of the display to adapt various zone-based display data processing and transmission schemes, thereby further improving the performance of the display, such as reducing power consumption and maintaining apparent display resolution. In some embodiments, the control logic may recover the compressed display data of the regions other than the point-of-gaze. In some embodiments, the control logic may control the scan of the pixels on the display panel and/or the update of display data to the pixels to adapt the various frame rates for different zones on the display panel.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1 illustrates an apparatus 100 including a display 102 and control logic 104. Apparatus 100 may be any suitable device, for example, a VR/AR device (e.g., VR headset, etc.), handheld device (e.g., dumb or smart phone, tablet, etc.), wearable device (e.g., eyeglasses, wrist watch, etc.), automobile control station, gaming console, television set, laptop computer, desktop computer, netbook computer, media center, set-top box, global positioning system (GPS), electronic billboard, electronic sign, printer, or any other suitable device. In this embodiment, display 102 is operatively coupled to control logic 104 and is part of apparatus 100, such as but not limited to, a head-mounted display, computer monitor, television screen, dashboard, electronic billboard, or electronic sign. Display 102 may be an OLED display, liquid crystal display (LCD), E-ink display, electroluminescent display (ELD), billboard display with LED or incandescent lamps, or any other suitable type of display.

Control logic 104 may be any suitable hardware, software, firmware, or combination thereof, configured to receive display data 106 (e.g., pixel data) and generate control signals 108 for driving the subpixels on display 102.

Control signals 108 are used for controlling writing of display data to the subpixels and directing operations of display 102. For example, subpixel rendering algorithms for various subpixel arrangements may be part of control logic 104 or implemented by control logic 104. As described in detail below with respect to FIGS. 6 and 8, control logic 104 in one example may include a data receiver 612 and a post-processing module 614 having a data recovery unit 802, a control signal generating unit 804, and a data converting unit 806. Control logic 104 may include any other suitable components, such as an encoder, a decoder, one or more processors, controllers, and storage devices. Control logic 104 may be implemented as a standalone integrated circuit (IC) chip, such as an application-specific integrated circuit (ASIC) or a field-programmable gate array (FPGA). Apparatus 100 may also include any other suitable component such as, but not limited to tracking devices 110 (e.g., inertial sensors, camera, eye tracker, GPS, or any other suitable devices for tracking motion of eyeballs, facial expression, head movement, body movement, and hand gesture) and input devices 112 (e.g., a mouse, keyboard, remote controller, handwriting device, microphone, scanner, etc.).

In this embodiment, apparatus 100 may be a handheld or a VR/AR device, such as a smart phone, a tablet, or a VR headset. Apparatus 100 may also include a processor 114 and memory 116. Processor 114 may be, for example, a graphics processor (e.g., graphics processing unit (GPU)), an application processor (AP), a general processor (e.g., APU, accelerated processing unit; GPGPU, general-purpose computing on GPU), or any other suitable processor. Memory 116 may be, for example, a discrete frame buffer or a unified memory. Processor 114 is configured to generate display data 106 in display frames and may temporally store display data 106 in memory 116 before sending it to control logic 104. Processor 114 may also generate other data, such as but not limited to, control instructions 118 or test signals, and provide them to control logic 104 directly or through memory 116. Control logic 104 then receives display data 106 from memory 116 or from processor 114 directly.

Figure 2A:
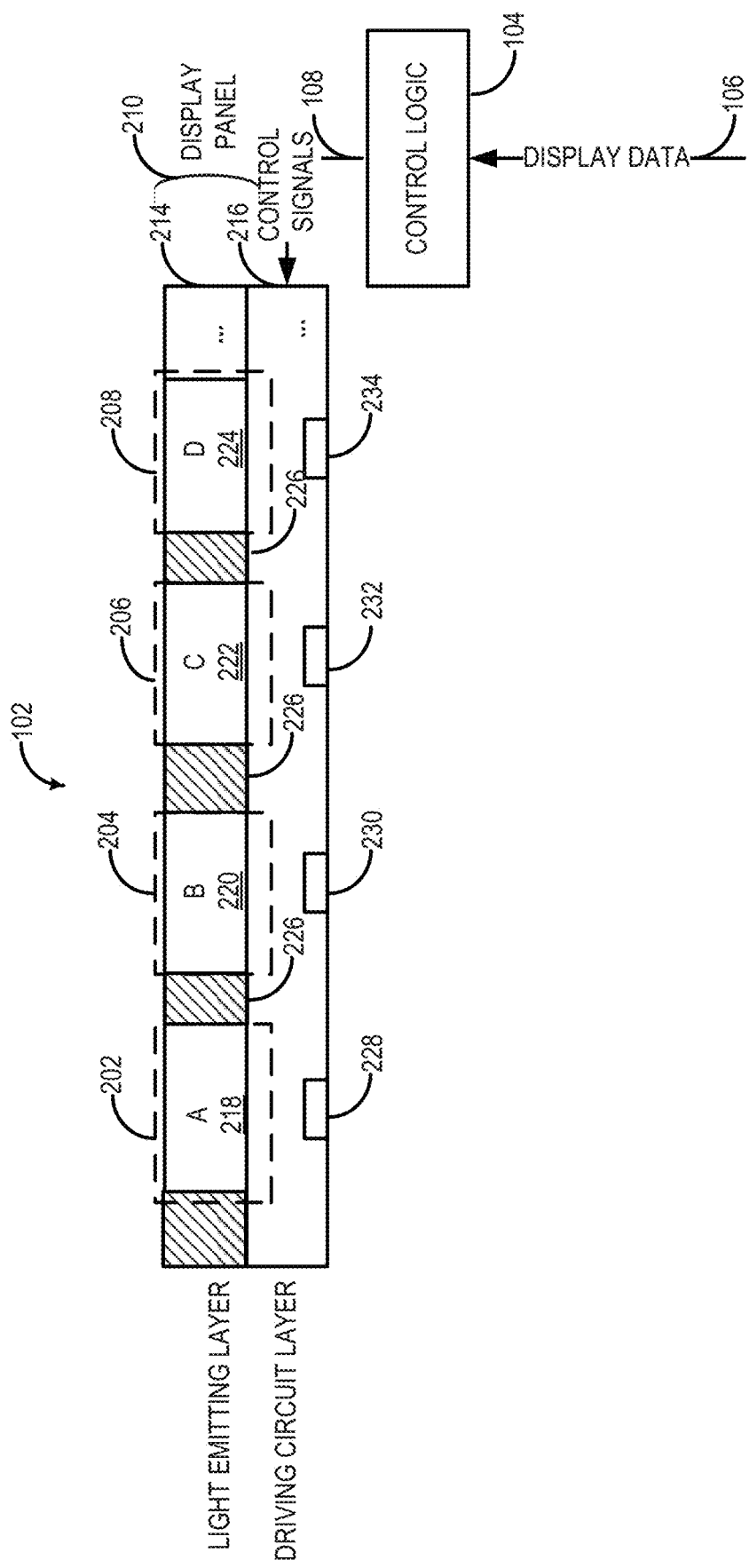
FIGS. 2A-2C are side-view diagrams illustrating various examples of the display shown in FIG. 1 in accordance with various embodiments.

FIG. 2A is a side-view diagram illustrating one example of display 102 including subpixels 202, 204, 206, and 208. Display 102 may be any suitable type of display, for example, OLED displays, such as an active-matrix OLED (AMOLED) display, or any other suitable display. Display 102 may include a display panel 210 operatively coupled to control logic 104. The example shown in FIG. 2A illustrates a side-by-side (a.k.a. lateral emitter) OLED color patterning architecture in which one color of light-emitting material is deposited through a metal shadow mask while the other color areas are blocked by the mask.

In this embodiment, display panel 210 includes a light emitting layer 214 and a driving circuit layer 216. As shown in FIG. 2A, light emitting layer 214 includes a plurality of light emitting elements (e.g., OLEDs) 218, 220, 222, and 224, corresponding to a plurality of subpixels 202, 204, 206, and 208, respectively. A, B, C, and D in FIG. 2A denote OLEDs in different colors, such as but not limited to, red, green, blue, yellow, cyan, magenta, or white. Light emitting layer 214 also includes a black array 226 disposed between OLEDs 218, 220, 222, and 224, as shown in FIG. 2A. Black array 226, as the borders of subpixels 202, 204, 206, and 208, is used for blocking lights coming out from the parts outside OLEDs 218, 220, 222, and 224. Each OLED 218, 220, 222, and 224 in light emitting layer 214 can emit a light in a predetermined color and brightness.

In this embodiment, driving circuit layer 216 includes a plurality of pixel circuits 228, 230, 232, and 234, each of which includes one or more thin film transistors (TFTs), corresponding to OLEDs 218, 220, 222, and 224 of subpixels 202, 204, 206, and 208, respectively. Pixel circuits 228, 230, 232, and 234 may be individually addressed by control signals 108 from control logic 104 and configured to drive corresponding subpixels 202, 204, 206, and 208, by controlling the light emitting from respective OLEDs 218, 220, 222, and 224, according to control signals 108. Driving circuit layer 216 may further include one or more drivers (not shown) formed on the same substrate as pixel circuits 228, 230, 232, and 234. The on-panel drivers may include circuits for controlling light emitting, gate scanning, and data writing as described below in detail. Scan lines and data lines are also formed in driving circuit layer 216 for transmitting scan signals and data signals, respectively, from the drivers to each pixel circuit 228, 230, 232, and 234. Display panel 210 may include any other suitable component, such as one or more glass substrates, polarization layers, or a touch panel (not shown). Pixel circuits 228, 230, 232, and 234 and other components in driving circuit layer 216 in this embodiment are formed on a low temperature polycrystalline silicon (LTPS) layer deposited on a glass substrate, and the TFTs in each pixel circuit 228, 230, 232, and 234 are p-type transistors (e.g., PMOS LTPS-TFTs). In some embodiments, the components in driving circuit layer 216 may be formed on an amorphous silicon (a-Si) layer, and the TFTs in each pixel circuit may be n-type transistors (e.g., NMOS TFTs). In some embodiments, the TFTs in each pixel circuit may be organic TFTs (OTFT) or indium gallium zinc oxide (IGZO) TFTs.

As shown in FIG. 2A, each subpixel 202, 204, 206, and 208 is formed by at least an OLED 218, 220, 222, and 224 driven by a corresponding pixel circuit 228, 230, 232, and 234. Each OLED may be formed by a sandwich structure of an anode, an organic light-emitting layer, and a cathode. Depending on the characteristics (e.g., material, structure, etc.) of the organic light-emitting layer of the respective OLED, a subpixel may present a distinct color and brightness. Each OLED 218, 220, 222, and 224 in this embodiment is a top-emitting OLED. In some embodiments, the OLED may be in a different configuration, such as a bottom-emitting OLED. In one example, one pixel may consist of three adjacent subpixels, such as subpixels in the three primary colors (red, green, and blue) to present a full color. In another example, one pixel may consist of four adjacent subpixels, such as subpixels in the three primary colors (red, green, and blue) and the white color. In still another example, one pixel may consist of two adjacent subpixels. For example, subpixels A 202 and B 204 may constitute one pixel, and subpixels C 206 and D 208 may constitute another pixel. Here, since the display data 106 is usually programmed at the pixel level, the two subpixels of each pixel or the multiple subpixels of several adjacent pixels may be addressed collectively by subpixel rendering to present the appropriate brightness and color of each pixel, as designated in display data 106 (e.g., pixel data). However, it is to be appreciated that, in some embodiments, display data 106 may be programmed at the subpixel level such that display data 106 can directly address individual subpixel without subpixel rendering. Because it usually requires three primary colors (red, green, and blue) to present a full color, specifically designed subpixel arrangements may be provided for display 102 in conjunction with subpixel rendering algorithms to achieve an appropriate apparent color resolution.

Figure 2B:
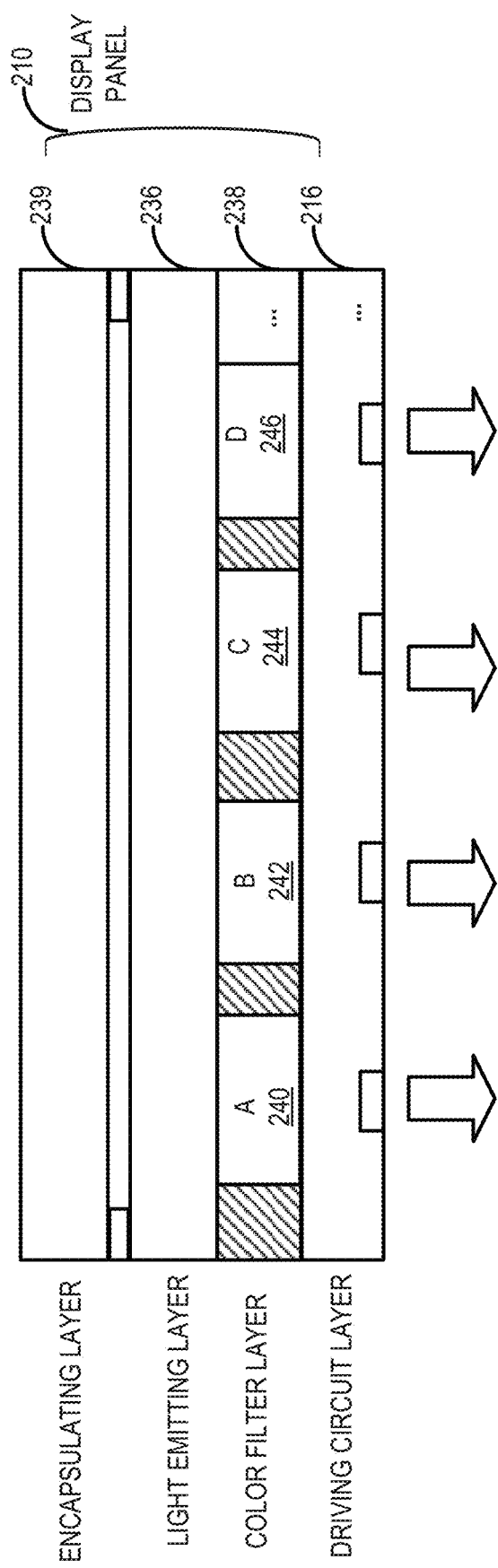

The example shown in FIG. 2A illustrates a side-by-side patterning architecture in which one color of light-emitting material is deposited through the metal shadow mask while the other color areas are blocked by the mask. In another example, a white OLEDs with color filters (WOLED+CF) patterning architecture can be applied to display panel 210. In the WOLED+CF architecture, a stack of light-emitting materials form a light emitting layer of the white light. The color of each individual subpixel is defined by another layer of color filters in different colors. As the organic light-emitting materials do not need to be patterned through the metal shadow mask, the resolution and display size can be increased by the WOLED+CF patterning architecture. FIG. 2B illustrates an example of a WOLED+CF patterning architecture applied to display panel 210. Display panel 210 in this embodiment includes driving circuit layer 216, a light emitting layer 236, a color filter layer 238, and an encapsulating layer 239. In this example, light emitting layer 236 includes a stack of light emitting sub-layers and emits the white light. Color filter layer 238 may be comprised of a color filter array having a plurality of color filters 240, 242, 244, and 246 corresponding to subpixels 202, 204, 206, and 208, respectively. A, B, C, and D in FIG. 2B denote four different colors of filters, such as but not limited to, red, green, blue, yellow, cyan, magenta, or white. Color filters 240, 242, 244, and 246 may be formed of a resin film in which dyes or pigments having the desired color are contained. Depending on the characteristics (e.g., color, thickness, etc.) of the respective color filter, a subpixel may present a distinct color and brightness. Encapsulating layer 239 may include an encapsulating glass substrate or a substrate fabricated by the thin film encapsulation (TFE) technology. Driving circuit layer 216 may be comprised of an array of pixel circuits including LTPS, IGZO, or OTFT transistors. Display panel 210 may include any other suitable components, such as polarization layers, or a touch panel (not shown).

Figure 2C:
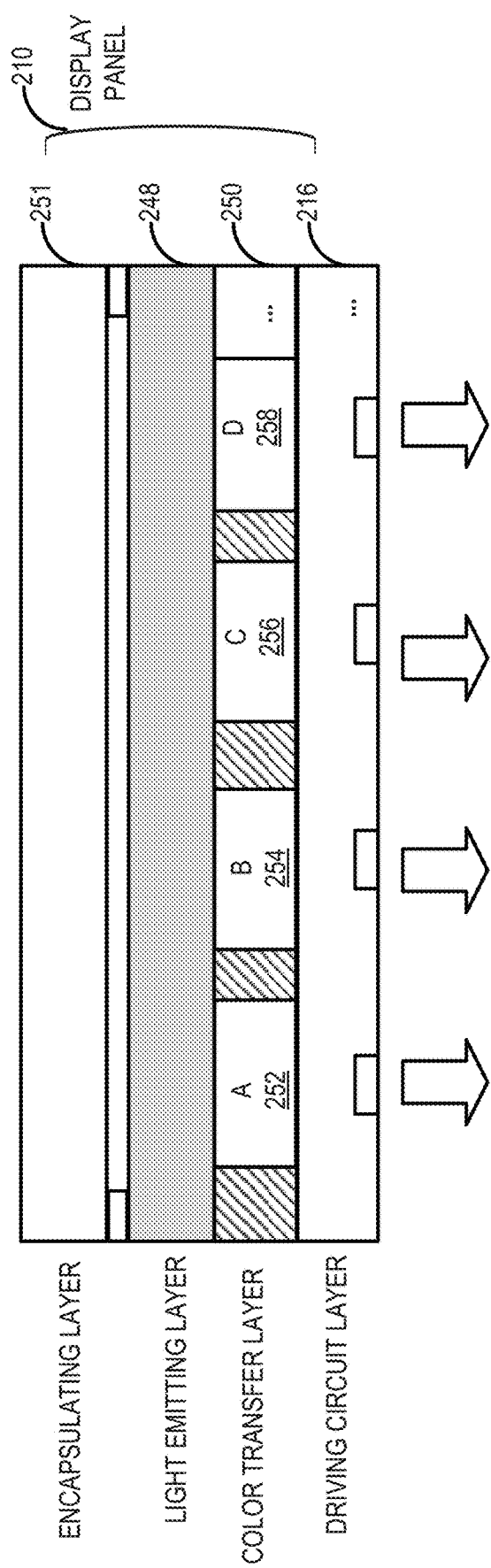

In still another example, a blue OLEDs with transfer color filters (BOLED+transfer CF) patterning architecture can be applied to display panel 210 as well. In the BOLED+transfer CF architecture, a light-emitting material of blue light is deposited without a metal shadow mask, and the color of each individual subpixel is defined by another layer of transfer color filters for different colors. FIG. 2C illustrates an example of a BOLED+transfer CF patterning architecture applied to display panel 210. Display panel 210 in this embodiment includes driving circuit layer 216, a light emitting layer 248, a color transfer layer 250, and an encapsulating layer 251. Light emitting layer 248 in this embodiment emits the blue light and can be deposited without a metal shadow mask. It is to be appreciated that in some embodiments, light emitting layer 248 may emit other colors of light. Color transfer layer 250 may be comprised of a transfer color filters array having a plurality of transfer color filters 252, 254, 256, and 258 corresponding to subpixels 202, 204, 206, and 208, respectively. A, B, C, and D in FIG. 2C denote four different colors of transfer color filters, such as but not limited to, red, green, blue, yellow, cyan, magenta, or white. Each type of transfer color filter may be formed of a color changing material. Depending on the characteristics (e.g., color, thickness, etc.) of the respective transfer color filter, a subpixel may present a distinct color and brightness. Encapsulating layer 251 may include an encapsulating glass substrate or a substrate fabricated by the TFE technology. Driving circuit layer 216 may be comprised of an array of pixel circuits including LTPS, IGZO, or OTFT transistors. Display panel 210 may include any other suitable component, such as polarization layers, or a touch panel (not shown).

The zone-based display data processing and transmission disclosed herein is suitable for any known OLED patterning architectures, including but not limited to, the side-by-side, WOLED+CF, and BOLED+CCM patterning architectures as described above. Although FIGS. 2A-2C are illustrated as an OLED display, it is to be appreciated that they are provided for an exemplary purpose only and without limitations. The zone-based display data processing and transmission disclosed herein may be applied to any suitable display as described above.

Figure 3:
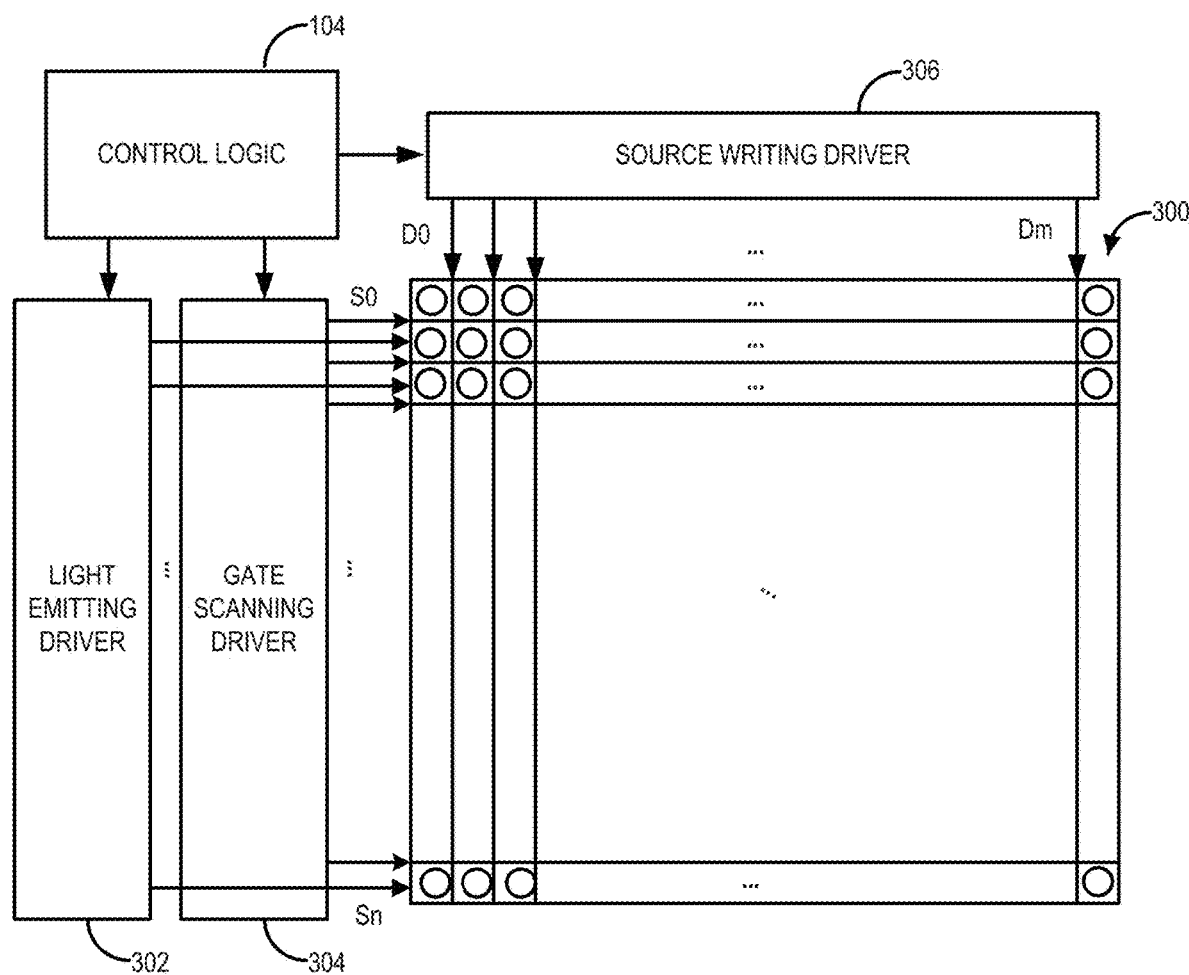
FIG. 3 is a plan-view diagram illustrating the display shown in FIG. 1 including multiple drivers in accordance with an embodiment.

FIG. 3 is a plan-view diagram illustrating display 102 shown in FIG. 1 including multiple drivers in accordance with an embodiment. Display panel 210 in this embodiment includes an array of subpixels 300 (e.g., OLEDs), a plurality of pixel circuits (not shown), and multiple on-panel drivers including a light emitting driver 302, a gate scanning driver 304, and a source writing driver 306. The pixel circuits are operatively coupled to array of subpixels 300 and on-panel drivers 302, 304, and 306. Light emitting driver 302 in this embodiment is configured to cause array of pixels 300 to emit lights in each frame. It is to be appreciated that although one light emitting driver 302 is illustrated in FIG. 3, in some embodiments, multiple light emitting drivers may work in conjunction with each other.

Gate scanning driver 304 in this embodiment applies a plurality of scan signals S0-Sn, which are generated based on control signals 108 from control logic 104, to the scan lines (a.k.a. gate lines) for each row of subpixels in array of subpixels 300 in a sequence. The scan signals S0-Sn are applied to the gate electrode of a switching transistor of each pixel circuit during the scan/charging period to turn on the switching transistor so that the data signal for the corresponding subpixel can be written by source writing driver 306. As will be described below in detail, the sequence of applying the scan signals to each row of array of subpixels 300 (i.e., the gate scanning order) may vary in different embodiments. In some embodiments, not all the rows of subpixels are scanned in each frame. It is to be appreciated that although one gate scanning driver 304 is illustrated in FIG. 3, in some embodiments, multiple gate scanning drivers may work in conjunction with each other to scan array of subpixels 300.

Source writing driver 306 in this embodiment is configured to write display data received from control logic 104 into array of subpixels 300 in each frame. For example, source writing driver 306 may simultaneously apply data signals D0-Dm to the data lines (a.k.a. source lines) for each column of subpixels. That is, source writing driver 306 may include one or more shift registers, digital-analog converter (DAC), multiplexers (MUX), and arithmetic circuit for controlling a timing of application of voltage to the source electrode of the switching transistor of each pixel circuit (i.e., during the scan/charging period in each frame) and a magnitude of the applied voltage according to gradations of display data 106. It is to be appreciated that although one source writing driver 306 is illustrated in FIG. 3, in some embodiments, multiple source writing drivers may work in conjunction with each other to apply the data signals to the data lines for each column of subpixels.

FIGS. 4A-4D are depictions of various examples of display panel 210 having an array of pixels divided into multiple zones in accordance with various embodiments. As described above, display panel 210 has array of subpixels 300 arranged in rows and columns, and a number of adjacent subpixels (e.g., two, three, or four subpixels) may constitute one pixel. That is, display panel 210 also has an array of pixels arranged in rows and columns, and each pixel may consist of a number of subpixels (e.g., two, three, or four subpixels). The array of pixels may be divided into a plurality of zones, each of which includes a sub-array of pixels. In some embodiments such as shown in FIGS. 4A-4D, some zones may be in a substantially rectangular or square shape. Each rectangular or square zone may be defined by a set of pointers, e.g., the start pointer and end pointer. For example, the start pointer may point to the pixel at the upper-left corner of the respective zone, and the end pointer may point to the pixel at the lower-right corner of the respective zone.

Figure 4A:
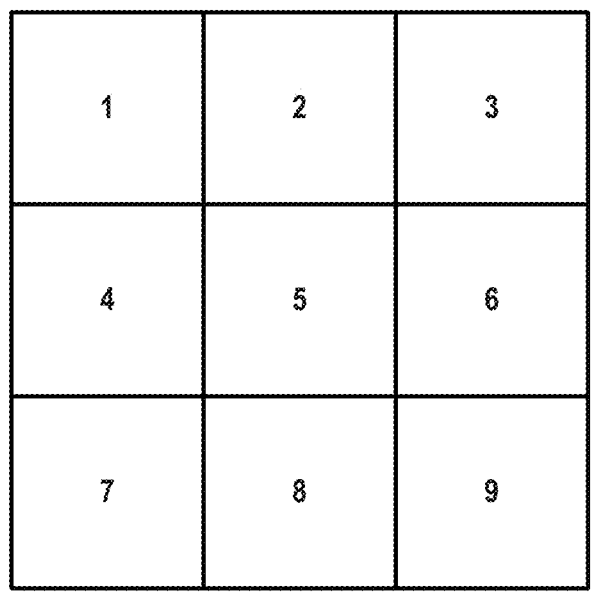
FIGS. 4A-4D are depictions of various examples of a display panel having an array of pixels divided into multiple zones in accordance with various embodiments.
Figure 4B:
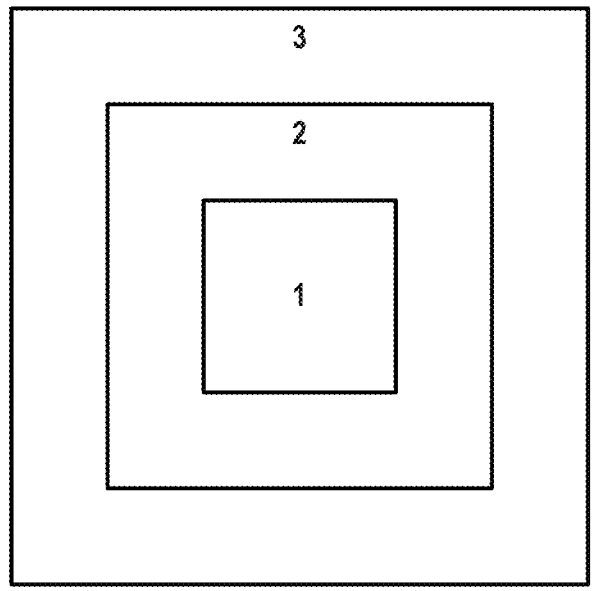

In FIG. 4A, the array of pixels on display panel 210 is divided into nine zones. In this embodiment, the array of pixels are evenly divided. Thus, each zone has the same size and shape, i.e., including the same number of pixels. Depending on the size and shape of the array of pixels, each zone may be in a substantially rectangular or square shape. In one example, for a display panel having a resolution of 2400×2160, the array of pixels is arranged in 2160 rows and 2400 columns. Each of the nine zones then includes a sub-array of pixels having 720 rows and 800 columns. For example, the zone 1 may be defined by the start pointer (0, 0) and the end pointer (799, 719).

It is to be appreciated that the shape and/or size of each zone may be different in some embodiments. For example, in FIG. 4B, the array of pixels on display panel 210 is divided into three zones. In this embodiment, the zone 1 may be in a substantially rectangular or square shape and has the center point overlapping the center point of display panel 210 (the array of pixels). In other words, the zone 1 is in the central region of display panel 210. In one example, for a display panel having a resolution of 2400×2160, the zone 1 may include a sub-array of pixels having 720 rows and 800 columns and defined by the start pointer (800, 720) and the end pointer (1599, 1439). The zone 2 is in the shape defined by subtracting the zone 1 from a larger concentric rectangle or square. Similarly, the zone 3 is in the shape defined by subtracting the rectangle or square (defining the zone 2) from another larger concentric rectangle or square.

Figure 4C:
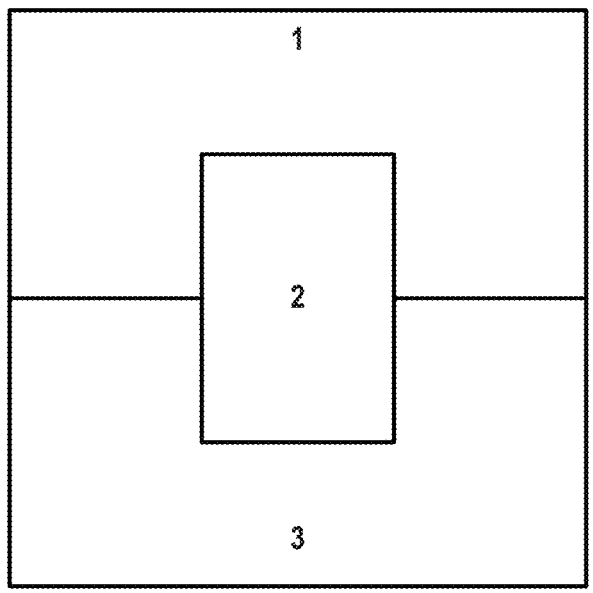
Figure 4D:
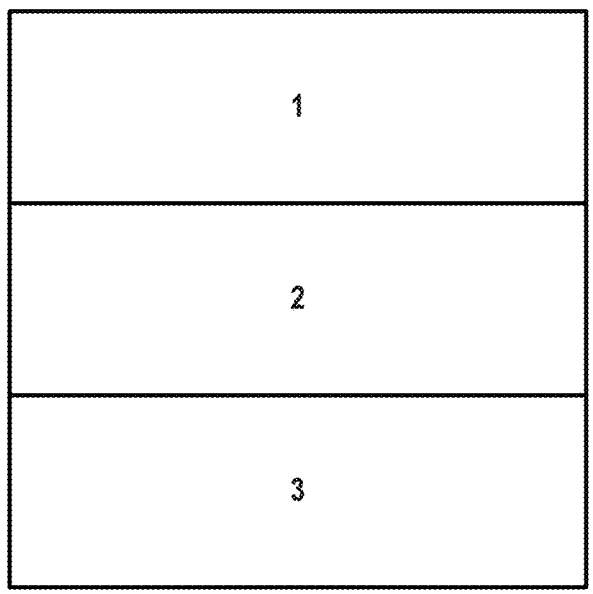

In FIG. 4C, the array of pixels on display panel 210 is divided into three zones. Similar to FIG. 4B, the zone 2 may be in a substantially rectangular or square shape in the central region of display panel 210 (the array of pixels). In one example, for a display panel having a resolution of 2400×2160, the zone 2 may include a sub-array of pixels having 720 rows and 800 columns and defined by the start pointer (800, 720) and the end pointer (1599, 1439). Each of the zone 1 and zone 3 is in the shape defined by subtracting the zone 2 from the respective half of the array of pixels in the column direction (scan direction or vertical direction). In some embodiments, the size of the zone 2 may be determined based on FOV. For example, if a display panel is designed to for a FOV of 110 degrees, then the width of the zone 2 may be set so that the FOV for the zone 2 is about 50 degrees.

It is to be appreciated that in some embodiments, the array of pixels may be divided in the column direction (scan direction or vertical direction) so that each zone includes pixels in at least one entire row of the array of pixels, i.e., no division in the row direction (data direction or horizontal direction). For example, in FIG. 4D, the array of pixels on display panel 210 is divided into three zones. In this embodiment, the array of pixels are evenly divided in the column direction. Thus, each zone has the same size and shape, i.e., including one-third of the total rows of the array of pixels. In one example, for a display panel having a resolution of 2400×2160, the zone 1 may include a sub-array of pixels having 720 rows and 2400 columns and defined by the start pointer (0, 0) and the end pointer (2399, 719), the zone 2 may include a sub-array of pixels having 720 rows and 2400 columns and defined by the start pointer (0, 720) and the end pointer (2399, 1439), and the zone 3 may include a sub-array of pixels having 720 rows and 2400 columns and defined by the start pointer (0, 1440) and the end pointer (2399, 2159).

Figure 5A:
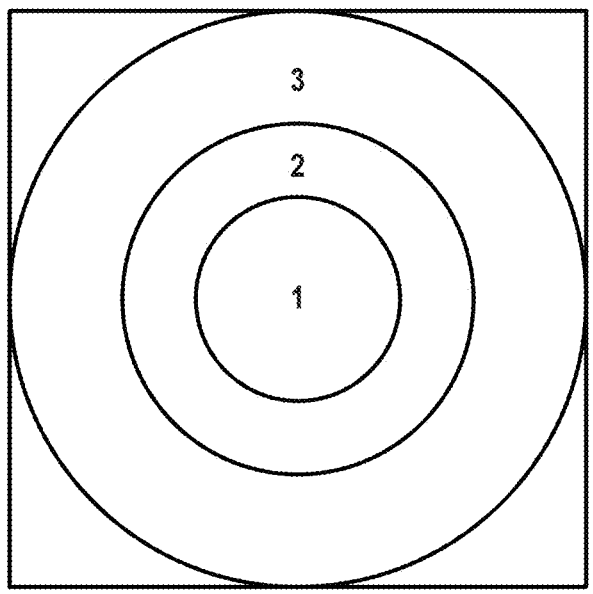
FIGS. 5A-5B are depictions of various examples of a display panel having an array of pixels divided into multiple zones in accordance with various embodiments.
Figure 5B:
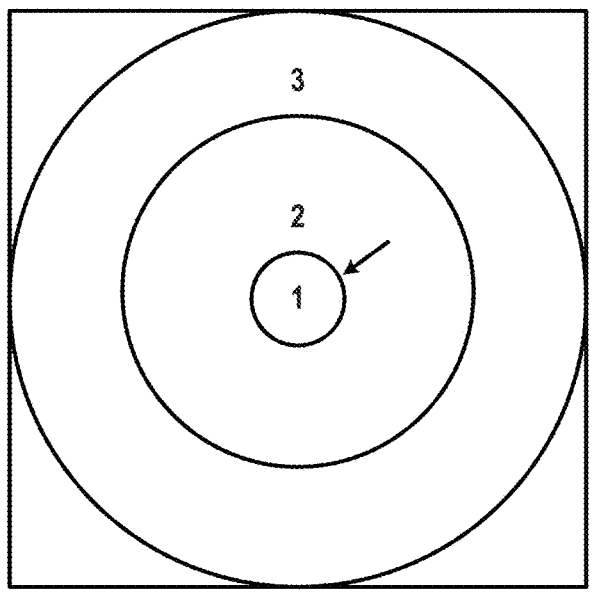

FIGS. 5A-5B are depictions of various examples of display panel 210 having an array of pixels divided into multiple zones in accordance with various embodiments. The division of the array of pixels is not limited to be based on zones in the rectangular or square shapes. In some embodiments, as human vision is in a circular-like shape, the division of the array of pixels may be based on zones in the substantially circular shape. In FIG. 5A, the array of pixels on display panel 210 is divided into three zones. The zone 1 may be in a substantially circular shape and have the center point overlapping the center point of display panel 210 (the array of pixels). That is, the zone 1 may be in the central region of display panel 210. The zone 1 may be defined by a different set of parameters, e.g., the center and radius. Each of the zone 2 and zone 3 may be in a substantially ring shape. In other words, the zone 2 and zone 3 may be concentric rings of the zone 1.

It is to be appreciated that the division of the array of pixels (e.g., the number, shape, and/or size of the zones) may be dynamically changed in some embodiments. For example, as shown in FIG. 5B, the sizes of the zone 1 and zone 2 may be changed from the ones in FIG. 5A. In this embodiment, the centers of each zone remain the same, but the radius of the first zone 1 decreases so that the size of the zone 1 decreases and the size of the zone 2 increases. As described below in detail, any suitable condition may be used to trigger the change of the division of the array of pixels, such as the motion of the user of display panel 210. For example, by sensing the increase of the acceleration of the user's movement, the radius of the zone 1 may decrease to reduce the size of the central zone of display panel 210. The higher the acceleration of the user, the smaller the radius of the zone 1 may be. In one example, the first zone 1 may disappear (i.e., the radius becomes zero) when the acceleration is above a threshold.

As understood by a person of ordinary skill in the art from the above-mentioned embodiments in FIGS. 4-5, the array of pixels on display panel 210 may be divided into two or more zones in various manners (e.g., various numbers, shapes, sizes, and/or relative positions), as long as each zone includes a sub-array of pixels. The manner in which the array of pixels is divided may be fixed or dynamically changed in response to any suitable trigger condition. It is to be appreciated that the array of pixels is not physically divided, but is logically divided into zones, so that the update of display data can be controlled at the zone-level so as to improve the performance of the display system, for example, reducing the data bandwidth at the display interface and reducing the power consumption of the display system, as described below in detail.

Figure 6:
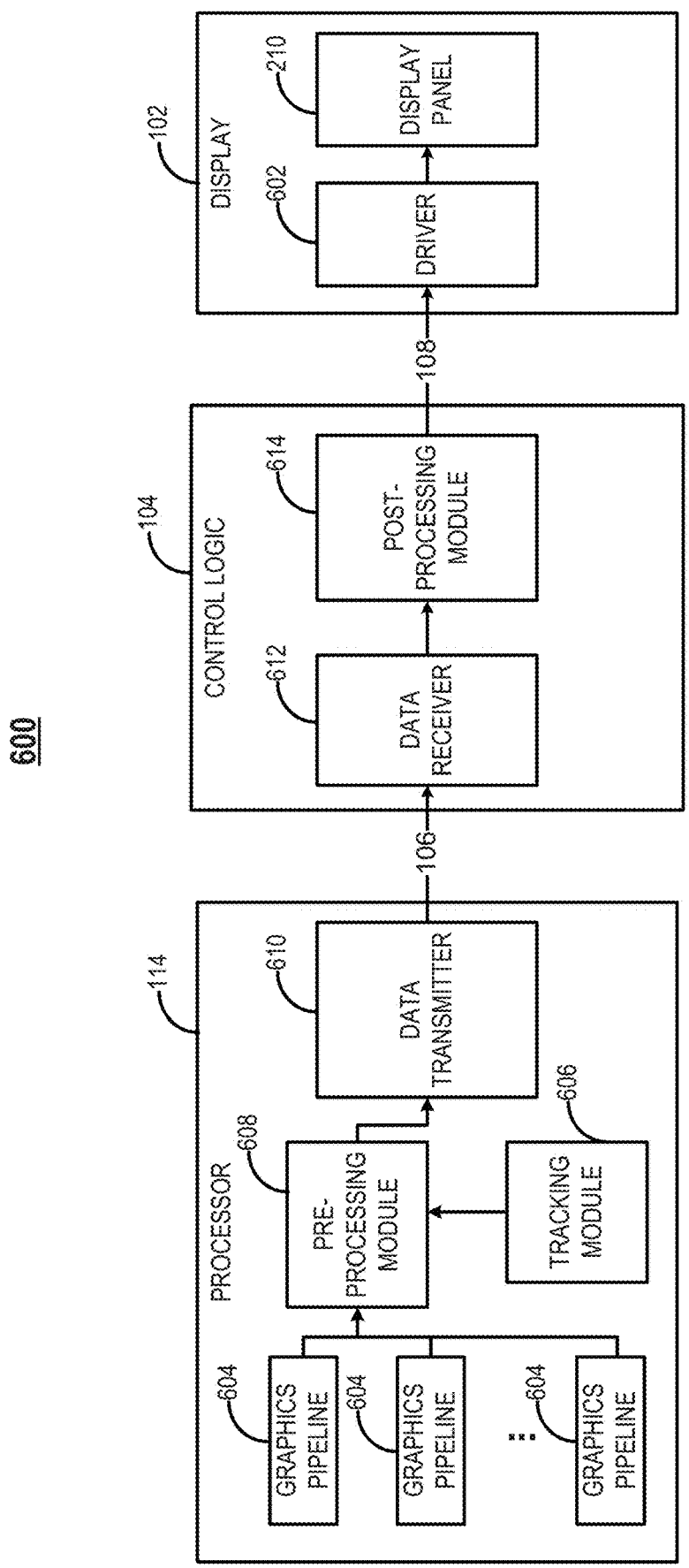
FIG. 6 is a block diagram illustrating a system including a display, control logic, and a processor in accordance with an embodiment.

FIG. 6 is a block diagram illustrating a display system 600 including display 102, control logic 104, and processor 114 in accordance with an embodiment. As described above, processor 114 may be any processor that can generate display data 106, e.g., pixel data, in each frame and provide display data 106 to control logic 104. Processor 114 may be, for example, a GPU, AP, APU, or GPGPU. Processor 114 may also generate other data, such as but not limited to, control instructions 118 or test signals (not shown in FIG. 6), and provide them to control logic 104. The stream of display data 106 transmitted from processor 114 to control logic 104 may include sets of processed display data for some zone(s) on display panel 210, for example, compressed display data with the reduced amount of data in each set or display data transmitted at the reduced frame rates, as described in any embodiment disclosed herein. As a result, the data bandwidth at the display interface (i.e., between processor 114 and control logic 104) and power consumption of display 102 can be reduced compared with known display systems.

In this embodiment, processor 114 includes graphics pipelines 604, a tracking module 606, a pre-processing module 608, and a data transmitter 610. Each graphics pipeline 604 may be a two-dimensional (2D) rendering pipeline or a three-dimensional (3D) rendering pipeline that transforms 2D or 3D images having geometric primitives in the form of vertices into pieces of display data, each of which corresponds to one pixel on display panel 210. Graphics pipeline 604 may be implemented as software (e.g., computing program), hardware (e.g., processing units), or combination thereof. Graphics pipeline 604 may include multiple stages such as vertex shader for processing vertex data, rasterizer for converting vertices into fragments with interpolated data, pixel shader for computing lighting, color, depth, and texture of each piece of display data, and render output unit (ROP) for performing final processing (e.g., blending) to each piece of display data and write them into appropriate locations of a frame buffer (not shown). Each graphics pipeline 604 may independently and simultaneously process a set of vertex data and generate the corresponding set of display data in parallel.

In this embodiment, graphics pipelines 604 are configured to generate a set of display data in each frame for each zone of the plurality of zones on display panel 210 (for example, as described above with respect to FIGS. 4-5). Each piece of display data may correspond to one pixel of the array of pixels on display panel 210. For example, for a display panel having a resolution of 2400×2160, display data generated by graphics pipelines 604 in each frame includes 2400×2160 pieces of display data, each of which represents a set of values of electrical signals to be applied to the respective pixel (e.g., consisting of a number of subpixels). The display data for the whole array of pixels on display panel 210 in each frame includes a plurality sets of display data, each of which corresponds to one of the plurality of zones divided from the array of pixels. Each set of display data generated by graphics pipelines 604 may be considered as "original" display data because no compression process has been applied to the set of display data to reduce the amount of data. In some embodiments, the size of each set of display data may be determined by two factors: the number of pieces of display data in the set and the size of each piece of display data. For original display data, the number of pieces of display data in each set for a zone may be the same as the number of pixels in the zone. For example, for a zone having a sub-array of pixels arranged in 720 rows and 800 columns, the number of pieces of display data in the corresponding set of original display data is 800×720. As to the size of each piece of display data, each piece of original display data may be packed bits (e.g., eight pixels/byte), bytes (up to 256 colors), 16-bit half-words (up to 64K colors), or 24-bit words (up to 16 million colors). In the example mentioned above, if the color depth is 16 bits per pixel (bpp), then the size of a set of original display data in each frame for the zone is 800×720×(16/2)=1152K bytes.

In some embodiments, each set of original display data for the respective zone may be generated by graphics pipelines 604 at a normal frame rate. The frame rate may be the frequency (rate) at which consecutive display frames are provided to display panel 210, such as 30 fps, 60 fps, 72 fps, 120 fps, or 240 fps. In some known display systems, the frame rate of display data may be the same as the standard (normal) refresh rate of display panel 210 and thus, is considered as the "normal" frame rate. In the example mentioned above, if the standard refresh rate of display panel 210 is 120 Hz and the normal frame rate is 120 fps, then the data bandwidth (bit rate) of graphics pipelines 604 for generating the original display data for each zone is 1152K×120=132M bytes per second (bps). In this embodiment, the same normal frame rate is used by graphics pipelines 604 for generating each set of original display for the respective zone. In some embodiments, each zone of the plurality zones includes the same number of pixels, and the data bandwidth of graphics pipelines 604 for generating the respective original display data for each zone is the same. In some embodiments, different zones may have different numbers of pixels, and the average data bandwidth per pixel (bit rate per pixel) for each zone is the same.

The frame rate and the amount of data in a frame may be considered as two attributes associated with each set of display data for the respective zone on display panel 210. The attributes may correspond to display attributes associated with each zone on display panel 210, such as refresh rate, display resolution, and pixels per inch (PPI). For example, the frame rate relates to the refresh rate, and the amount of data in a frame relates to the display resolution or PPI. In this embodiment, assuming the number of pixels in each zone is the same, then the two attributes mentioned above are the same for each set of display data for the respective zone generated by graphics pipelines 604. As described below in detail, at least one of the attributes may be adjusted by pre-processing module 608 for at least zone on display panel 210 so that the average data bandwidth at the display interface can be reduced compared with the known display systems. Consequently, at least one display attribute may be set differently for the different zones on display panel 210, thereby reducing the power consumption of display 102. On the other hand, various compensation mechanisms may be employed by control logic 104 in conjunction with display 102 to maintain the apparent display resolution on display panel 210 without sacrificing user experience.

In this embodiment, tracking module 606 is configured to determine a gazing zone of the plurality of zones based on a point-of-gaze of a user of display system 600. For example, display system 600 may be a VR headset, and the user wears the VR headset. Tracking module 606 may be operatively coupled to an eye tracker, which is part of tracking devices 110. Tracking module 606 may receive signals indicating the point-of-gaze of the user from the eye tracker. Tracking module 606 may analyze the signals from the eye tracker and dynamically determine the current gazing zone in real-time. In some embodiments, Tracking module 606 may be operatively coupled to any other tracking devices 110 for tracking the head and/or body movement of the user. Tracking module 606 may receive signals indicating the head and/or body movement of the user from tracking devices 110 (e.g., magnetic, inertial, or optical based head or body trackers). Tracking module 606 may analyze the signals indicating the head and/or body movement as well in determining the current gazing zone. In some embodiments, the plurality of zones on display panel 210 may be predefined, and the zone in which the point-of-gaze of the user locates may be dynamically determined by tracking module 606 as the current gazing zone. In some embodiments, tracking module 606 may set the point-of-gaze as the center point of the gazing zone and dynamically define the gazing zone based on the center point, for example, by setting the radius of the gazing zone that has a circular shape, or setting the side length for the gazing zone that has a square shape. It is to be appreciated that in some embodiments, the zone that is closest to the center point of the array of pixels on display panel 210 (e.g., the zone 5 in FIG. 4A, zone 1 in FIGS. 4B and 5A, and zone 2 in FIGS. 4C and 4D) may be predefined as the default gazing zone (or normal zone) without considering the point-of-gaze of the user. In other words, the gazing zone may be the zone in the central region on display panel 210 by default.

In some embodiments, tracking module 606 may be further configured to determine the user's current motion status. As described above, tracking module 606 may receive signals indicating the head and/or body movement of the user from tracking devices 110, such as the speed, acceleration, angle, and pose of the head or any part of the user body in real-time. Tracking module 606 may compare the user's motion status to a threshold to determine whether the user is in the stationary state or motion state. The threshold may a certain value of the speed, acceleration, angle, or pose of the head or any part of the user body or any combination thereof. As described below in detail, tracking module 606 may provide reference signals (e.g., based on the eye tracking and/or motion detection of the user) to pre-processing module 608 to trigger the zone-based display data processing and transmission and determine the specific scheme of the zone-based display data processing and transmission to be applied.

In this embodiment, pre-processing module 608 is operatively coupled to graphics pipelines 604 and configured to process the sets of original display data for each zone of display panel 210 provided by graphics pipelines 604 in order to reduce the average data bandwidth of transmitting stream of display data 106 to control logic 104. In some embodiments, pre-processing module 608 may be operatively coupled to tracking module 606 and process the set of original display data for the gazing zone (or normal zone) differently from the sets of original display data for each zone other than the gazing zone (or normal zone). In some embodiments, pre-processing module 608 may receive the user's motion status from tracking module 606 and process the sets of original display data in different states for the same zone differently based on the user's motion status. As described above, the zone-based original display data is associated with various attributes, such as the frame rate and amount of data, which may affect the data bandwidth at the display interface and the power consumption of display 102. Thus, pre-processing module 608 may implement various display data processing schemes to adjust one or more attributes associated with the zone-based original display data.

In some embodiments, pre-processing module 608 may process the set of original display data for the different zones other than the gazing zone (or normal zone) differently. In one example, pre-processing module 608 may compress the set of original display data for a first zone other than the gazing zone using a first approach and compress the set of original display data for a second zone other than the gazing zone using a second approach different from the first approach. In another example, pre-processing module 608 may set a first reduced frame rate for a first zone other than the normal zone and set a second reduced frame rate different from the first reduced frame rate for a second zone other than the normal zone.

Figure 7:
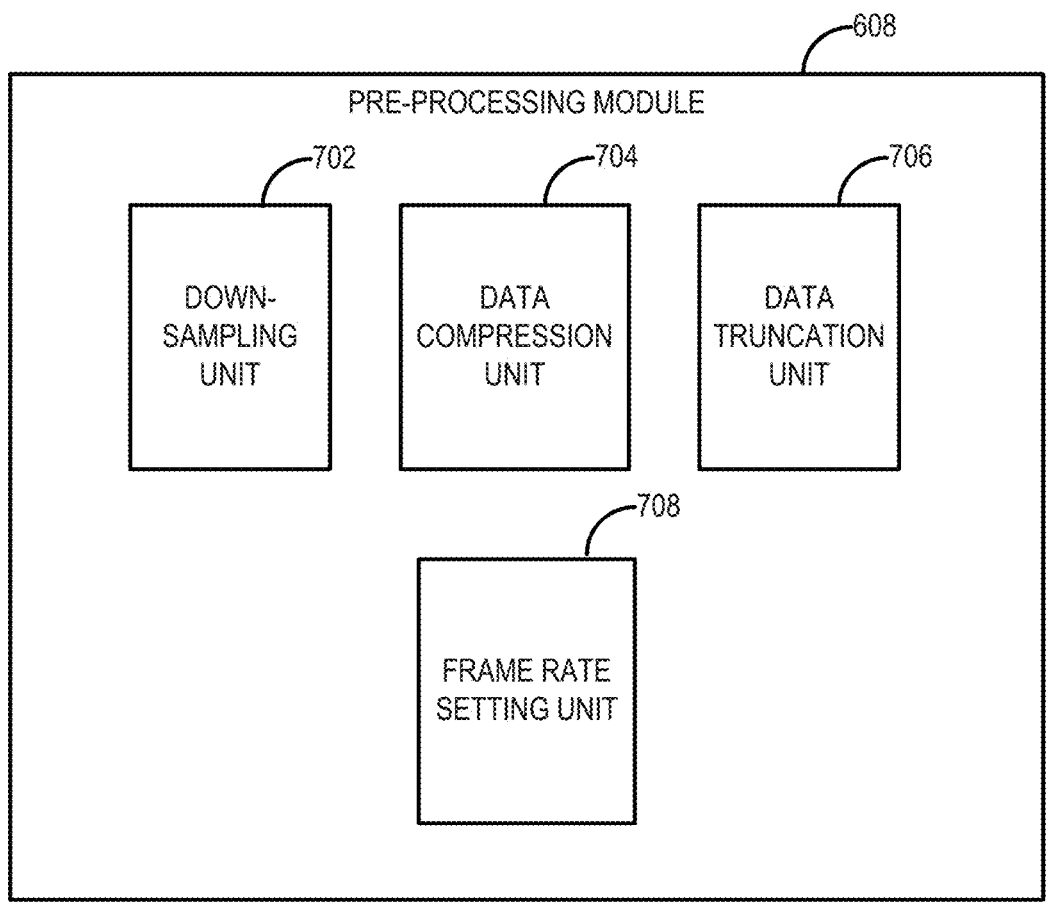
FIG. 7 is a detailed block diagram illustrating one example of a pre-processing module in the processor shown in FIG. 6 in accordance with an embodiment.

In some embodiments, pre-processing module 608 may be configured to, for each zone other than the gazing zone, compress the corresponding set of original display data in each frame to reduce the amount of data in the set of original display data in each frame. It is to be appreciated that the compression of original display data in not limited to any specific encoding approaches for data compression as known in the art, but may include any approaches that can reduce the amount of data (e.g., the size of the bit stream) in each frame for the respective zone. The "compression" referred herein may include, but is not limited to, down-sampling, data compression, and data truncation. FIG. 7 is a detailed block diagram illustrating one example of pre-processing module 608 in processor 114 shown in FIG. 6 in accordance with an embodiment. In this embodiment, pre-processing module 608 includes a down-sampling unit 702, a data compression unit 704, and a data truncation unit 706.

As described above, each set of original display data may include pieces of display data each representing one of the pixels in the corresponding zone. In other words, the number of pieces of display data in each set of original display data is the same as the number of pixels in the corresponding zone. In some embodiments, down-sampling unit 702 may reduce the amount of data in a set of display data by reducing the number of pixels that are represented by the set of display data, i.e., the number of pieces of display data. Thus, the number of pieces of display data in each set of compressed display data may be smaller than the number of pixels in the corresponding zone.

Figure 9:
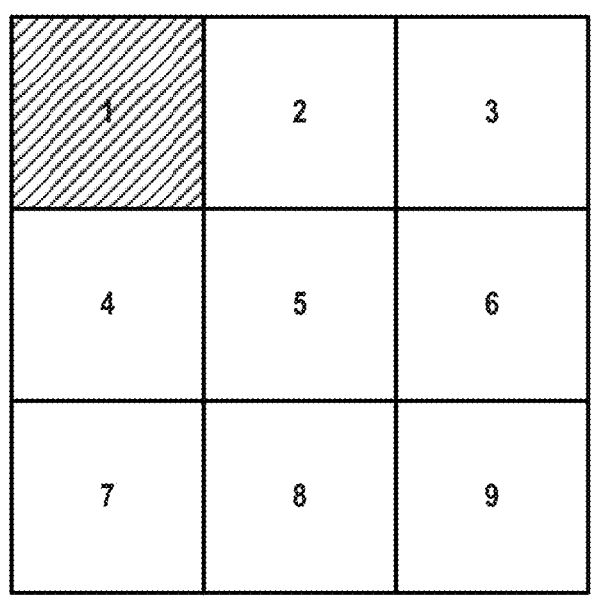
FIG. 9 is a depiction of an example of a gazing zone of multiple zones on a display panel in accordance with an embodiment.
Figure 10A:
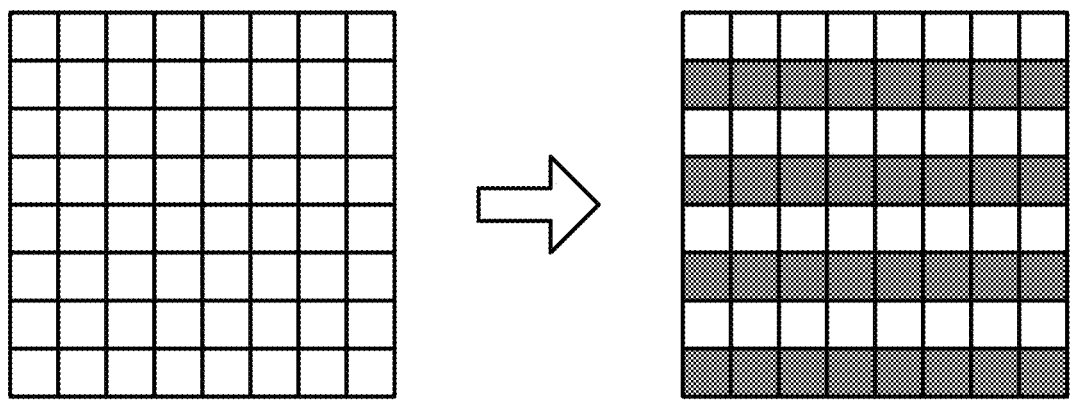
FIGS. 10A-10B are depictions of an example of compressing and recovering display data of one of multiple zones on a display panel in accordance with an embodiment.
Figure 11A:
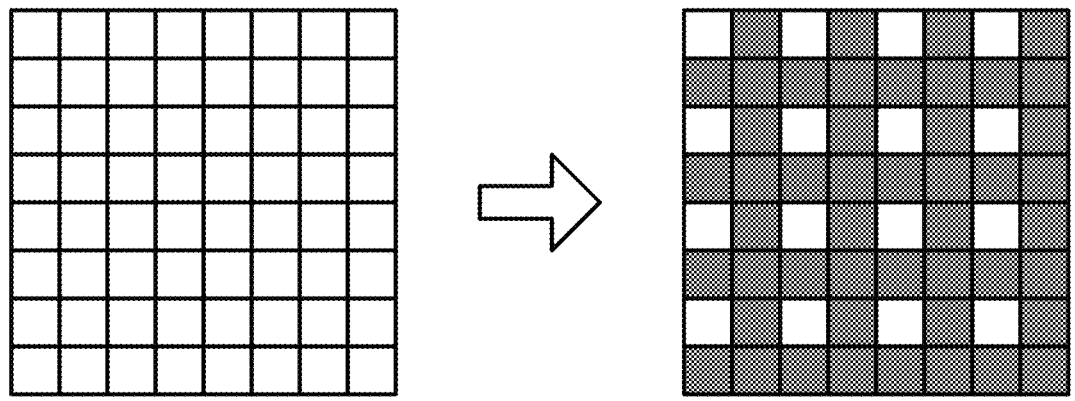
FIGS. 11A-11B are depictions of another example of compressing and recovering display data of one of multiple zones on a display panel in accordance with an embodiment.

Turning now to FIG. 9, in one example, the gazing zone 1 on display panel 210 may be determined by tracking module 606 as the user's point-of-gaze is in the zone 1. As shown in the left portion of FIGS. 10A and 11A, each zone in FIG. 9 has a sub-array of pixels arranged in eight rows and eight columns (each block representing one pixel). In other words, each zone in FIG. 9 has a resolution of 8×8 (i.e., 64 pixels). The set of original display data in each frame for the gazing zone 1 thus includes 64 pieces of display data each representing one pixel. In one example, for each zone other than the gazing zone 1, i.e., the zones 2-9, down-sampling unit 702 may eliminate one half of the pieces of display data, e.g., the pieces of display data representing pixels in the even rows (i.e., the dark blocks shown in the right portion of FIG. 10A). In another example, for each zone other than the gazing zone 1, i.e., the zones 2-9, down-sampling unit 702 may eliminate three-fourth of the pieces of display data, e.g., the pieces of display data representing the pixels in the even rows and pixels in the even columns (the dark blocks shown in the right portion of FIG. 11A). In this embodiment, because human vision is more sensitive to the color and brightness of display images close to the point-of-gaze, down-sampling unit 702 may apply down-sampling to the zones other than the gazing zone (e.g., the zones 2-9), but not the gazing zone (e.g., the zone 1).

It is to be appreciated that the down-sampling frequency (i.e., the ratio of the number of remaining pieces of display data in the set of compressed display data and the total number of pieces of display data in the set of original display data) applied by down-sampling unit 702 may vary in different examples. Even under the same down-sampling frequency, down-sampling unit 702 may eliminate pieces of display data representing different pixels (i.e., applying different down-sampling patterns) in different examples. In some embodiments, down-sampling unit 702 may apply a relatively uniform down-sampling pattern, such as the examples in FIGS. 10A and 11A. In some embodiments, the down-sampling frequency and/or down-sampling pattern may be different for each zone other than the gazing zone (e.g., the zones 2-9). In one example, a higher down-sampling frequency may be applied by down-sampling unit 702 to the zones closer to the gazing zone (e.g., the zones 2, 4, and 5), while a lower down-sampling frequency may be applied by down-sampling unit 702 to the zones further from the gazing zone (e.g., the zones 3, 6, and 9). In another example, a uniform down-sampling pattern may be applied by down-sampling unit 702 if the image to be displayed on the respective zone has a uniform pattern, while another down-sampling pattern focusing on the central region may be applied by down-sampling unit 702 if the image to be displayed on the respective zone has patterns concentrating in the center. In other words, down-sampling unit 702 may adaptively select different down-sampling algorithms, e.g., different down-sampling frequencies and/or patterns, for each zone based on various factors, such as but not limited to, the distance from the gazing zone, the image to be displayed on the zone, the user's motion status, etc. In some embodiments, down-sampling unit 702 may apply down-sampling to the gazing zone (e.g., the zone 1) as well, but using a down-sampling algorithm different from the one applied to the zones other than the gazing zone (e.g., the zones 2-9), which for example, has a higher down-sampling frequency, to preserve more information in the set of compressed display data for the gazing zone.

Referring back to FIG. 7, data compression unit 704 may reduce the amount of data in each set of original display data for the respective zone other than the gazing zone by any suitable data compression/encoding algorithms. Different from the down-sampling performed by down-sampling unit 702, data compression performed by data compression unit 704 may not reduce the number of pieces of display data in each set of display data, but instead reduce the amount of data in each piece of display data, e.g., the bits representing one pixel. Data compression unit 704 may apply any suitable encoding algorithms, such as but not limited to VESA display stream compression (DSC) algorithm, various Huffman coding algorithms, run-length encoding (RLE) algorithm, differential pulse code modulation (DPCM) algorithm, various lossy compression algorithms, or the like. In some embodiments, different encoding algorithms may be applied by data compression unit 704 to different sets of original display data for different zones.

In this embodiment, data truncation unit 706 may reduce the amount of data in each set of original display data for the respective zone other than the gazing zone by truncating certain bit(s) in the set of original display data. For example, the least significant bit (LSB) may be truncated by data truncation unit 706 from each piece of display data of the set of original display data in each frame. It is to be appreciated that down-sampling unit 702, data compression unit 704, and data truncation unit 706 may work alone or together to compress each set of original display data in each frame for the respective zone. It is also to be appreciated that in some embodiments, the different sets of original display data for different zones may be compressed by different units or different combinations of units described above. In one example, the set of original display data may not be compressed by pre-processing module 608 at all or compressed by data truncation unit 706 only; the sets of original display data for zones close to the gazing zone may be compressed by down-sampling unit 702 and data truncation unit 706; the sets of original display data for zones far from the gazing zone may be compressed by down-sampling unit 702, data compression unit 704, and data truncation unit 706.

In some embodiments, pre-processing module 608 may be configured to, for each zone other than a normal zone, set a reduced frame rate lower than the normal frame rate at which the corresponding set of display data is generated. As shown in FIG. 7, pre-processing module 608 may further include a frame rate setting unit 708 that can set the frame rate at the zone level, i.e., for each set of display data of the respective zone (either the original display data or compressed display data). The frame rate set by frame rate setting unit 708 may be the same as the normal frame rate at which the original display data is generated by graphics pipelines 604, such as for the set of display data for a normal zone of the plurality of zones on display panel 210. The frame rate set by frame rate setting unit 708 may be lower than the normal frame rate (i.e., a reduced frame rate), for example, for the sets of display data for each zone other than the normal zone. In some embodiments, frame rate setting unit 708 may reduce the frame rate for the normal zone as well under certain conditions, such as in the stationary state, or to the extent that the reduced frame rate for the normal zone is still higher than the reduced frame rates for the zones other than the normal zone. As described above, the normal zone may be predefined, such as the zone that is closest to the center of the array of pixels, i.e., in the central region of display panel 210. In some embodiments, the normal zone may be the same as the gazing zone that is determined by tracking module 606.

Returning now to FIG. 6, data transmitter 610 in this embodiment is operatively coupled to pre-processing module 608 and configured to transmit stream of display data 106 in each frame to control logic 104. Stream of display data 106 may include sets of display data for each zone, such as the gazing zone and the zones other than the gazing zone, the normal zone and the zones other than the normal, or the gazing-normal zone (if the normal zone is the same as the gazing zone) and the zones other than the gazing-normal zone. In one example, a set of display data in stream of display data 106 may be original display data without compression for the gazing zone or gazing-normal zone. In another example, a set of display data in stream of display data 106 may be compressed display data for zones other than the gazing zone or the gazing-normal zone. In still another example, a set of display data in stream of display data 106 may be transmitted at the normal frame rate for the normal zone or the gazing-normal zone. In still another example, a set of display data in stream of display data 106 may be transmitted at the reduced frame rate lower than the normal frame rate for the zones other than the normal zone or the gazing-normal zone. In yet another example, a set of display data in stream of display data 106 may be original display data and transmitted at the normal frame rate for the gazing-normal zone. In yet another example, a set of display data in stream of display data 106 may be compressed display data and transmitted at the reduced frame rate for the zones other than the gazing-normal zone.

Data transmitter 610 may be any suitable display interface between processor 114 and control logic 104, such as but not limited to, display serial interface (DSI), display pixel interface (DPI), and display bus interface (DBI) by the Mobile Industry Processor Interface (MIPI) Alliance, unified display interface (UDI), digital visual interface (DVI), high-definition multimedia interface (HDMI), and DisplayPort (DP). Based on the specific interface standard adopted by data transmitter 610, stream of display data 106 may be transmitted in series in the corresponding data format along with any suitable timing signals, such as vertical synchronization (V-Sync), horizontal synchronization (H-Sync), vertical back porch (VBP), horizontal back porch (HBP), vertical front porch (VFP), and horizontal front porch (HVP), which are used to organize and synchronize stream of display data 106 in each frame with the array of pixels on display panel 210.

In addition to transmitting stream of display data 106 to control logic 104, data transmitter 610 may also transmit other control data (e.g., commands/instructions) or status information to control logic 104 and/or receive information (e.g., status or pixel information) from control logic 104 or display panel 210. For example, information related to the division of the array of pixels into the plurality of zones may be communicated between processor 114 and control logic 104 or between processor 114 and display 102 via data transmitter 610. In additional, information related to the compression of original display data (e.g., the specific down-sampling, data compression, and/or data truncation algorithms and parameters used for each zone) may be communicated between processor 114 and control logic 104. Moreover, information related to the frame rate reduction may be communicated between processor 114 and control logic 104 as well. Information related to the reference signals provided by tracking module 606, e.g., the gazing zone and the user's motion status, may be transmitted to control logic 104 by data transmitter 610. In some embodiments, the control data and status information may be embedded in stream of display data 106. In some embodiments, the control data and status information may be transmitted via a side channel separate from the channel used for transmitting stream of display data 106.

Figure 12:
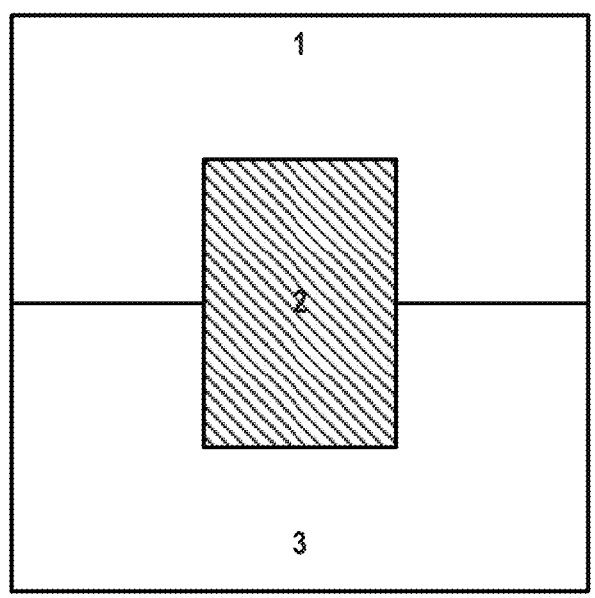
FIG. 12 is a depiction of an example of a normal zone of multiple zones on a display panel in accordance with an embodiment.
Figure 13:
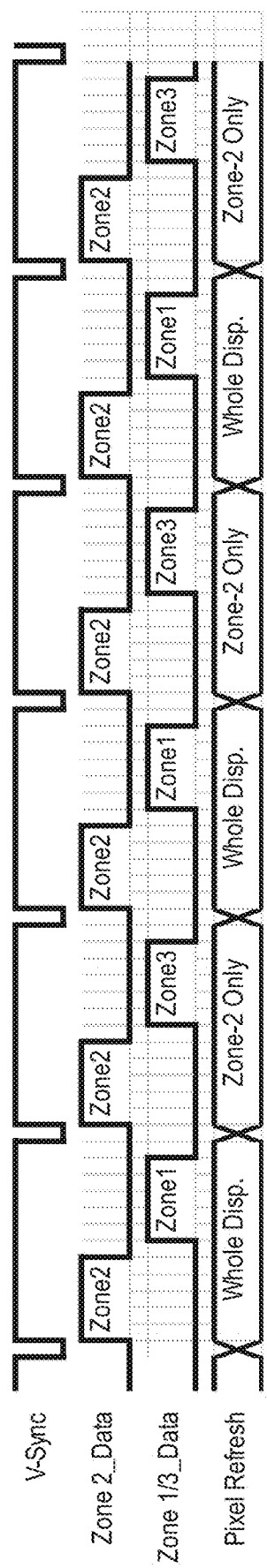
FIG. 13 is a timing diagram of an example of transmitting and refreshing display data for different zones on a display panel shown in FIG. 12 at different frame rates in accordance with an embodiment.

Referring to FIG. 12, the normal zone 2 in the central region of display panel 210 may be predetermined from the three zones 1, 2, and 3 on display panel 210. In some embodiments, the width of the normal zone 2 may be set so that the FOV of the normal zone 2 is about 50 degrees. FIG. 13 is a timing diagram of an example of transmitting and refreshing display data for different zones on display panel 210 shown in FIG. 12 at different frame rates in accordance with an embodiment. As shown in FIG. 13, the V-Sync signal defines the consecutive frames by signifying the start of each new frame with a low voltage level. The frame rate defined by the V-Sync signal may be the same as the standard refresh rate of display panel 210 (i.e., the normal frame rate). In this example, the set of display data for the normal zone 2 is transmitted at the normal frame rate. The set of display data for the zone 1 or the zone 3 is transmitted at the reduced frame rate that is one half of the normal frame rate. As shown in FIG. 13, the set of display data for the zone 1 is transmitted in each alternate frame, e.g., each odd frame, and the set of display data for the zone 3 is transmitted in each another alternate frame, e.g., each even frame. In this embodiment, the set of display data for the normal zone 2 is transmitted first in each frame, followed by the set of display data for the zone other than the normal zone 2, e.g., the zone 1 or zone 3.

In some embodiments, frame rate setting unit 708 may eliminate the set of display data for the zone 1 generated in each even frame so that the frame rate at which the set of display data for the zone 2 is provided to control logic 104 can be reduced to one half of the normal frame rate. Similarly, frame rate setting unit 708 may eliminate the set of display data for the zone 3 generated in each odd frame so that the frame rate at which the set of display data for the zone 3 is provided to control logic 104 can be reduced to one half of the normal frame rate. It is to be appreciated that in this embodiment, for some rows of the array of pixels (e.g., the rows in the normal zone 2), because the pixels in the same row are separated into different zones (e.g., the zones 1 and 2 or the zones 2 and 3), the pieces of display data in the same row are transmitted at different frame rates. Thus, certain line/row-based data compression algorithms may not be applied by data compression unit 704, such as VESA DSC algorithms.

Figure 14:
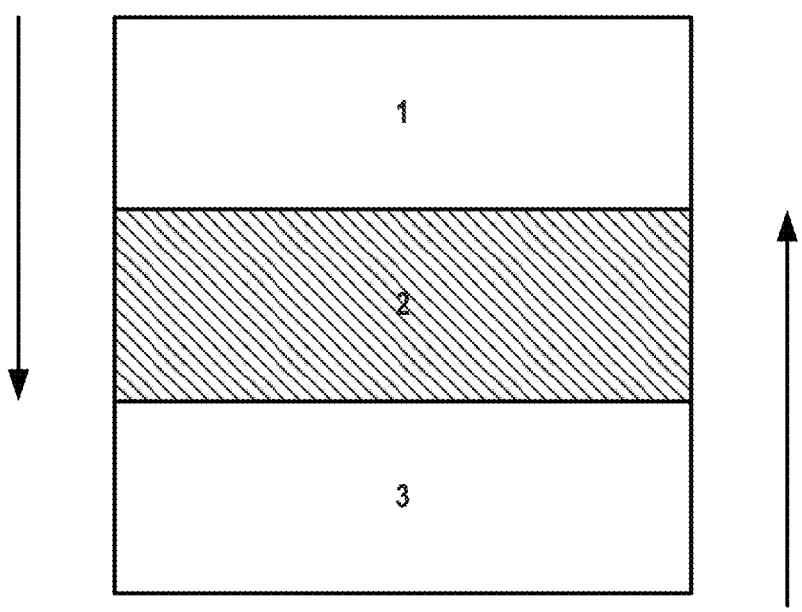
FIG. 14 is a depiction of another example of a normal zone of multiple zones on a display panel in accordance with an embodiment.

Referring to FIG. 14, the normal zone 2 may be predetermined from the three zones 1, 2, and 3 on display panel 210. In this embodiment, each of the three zones 1, 2, and 3 may include one-third of the total rows of the array of pixels. The normal zone 2 has all pixels in the entire row for each row in the normal zone 2. Compared with the normal zone 2 illustrated in FIG. 12, assuming the numbers of rows in the normal zones 2 are the same, the normal zone 2 in FIG. 14 has less bandwidth reduction effect because it has more pixels. On the other hand, the normal zone 2 in FIG. 14 is relatively easy for designing the corresponding display panel, e.g., the arrangement of scan lines and data lines, because the pixels in the same row are scanned at the same frame rate. Moreover, because all the pixels in the same row are in the same zone, line/row-based data compression algorithms can be applied by data compression unit 704. As described above, the gate scanning order for the array of pixels may vary in different examples. In this embodiment, the gate scanning order may be switched between two opposite column directions in different frames, e.g., up-to-down and down-to-up.

Figure 15:
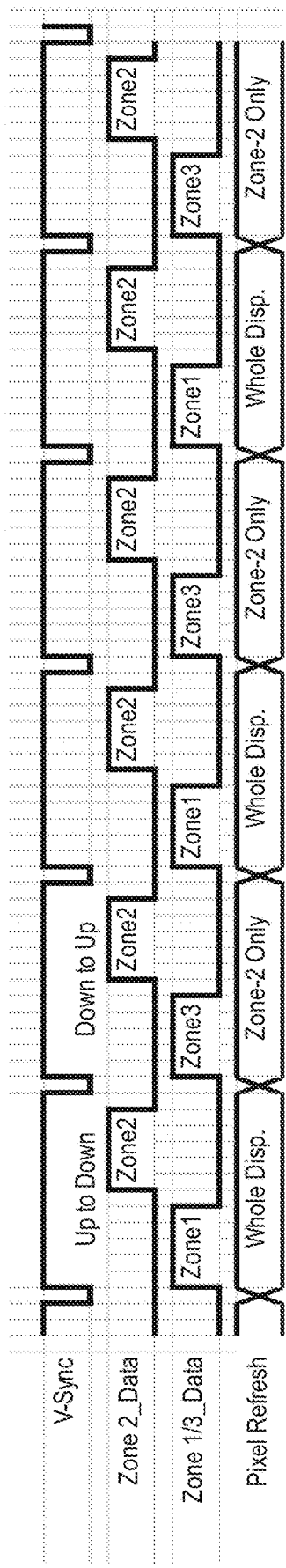
FIG. 15 is a timing diagram of an example of transmitting and refreshing display data for different zones on a display panel shown in FIG. 14 at different frame rates in accordance with an embodiment.
Figure 16:
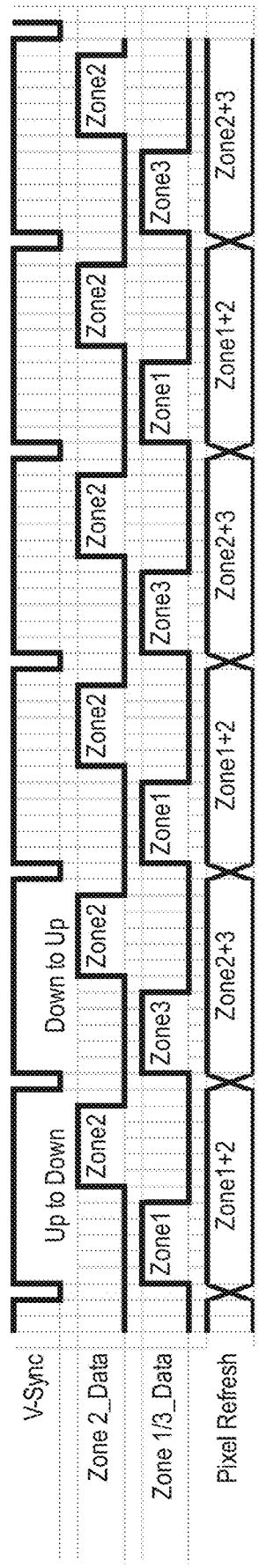
FIG. 16 is a timing diagram of another example of transmitting and refreshing display data for different zones on a display panel shown in FIG. 14 at different frame rates in accordance with an embodiment.

Similar to the exemplary timing diagram shown in FIG. 13, as shown in FIGS. 15 and 16, the set of display data for the normal zone 2 in transmitted at the normal frame rate, while the set of display data for the zone other than the normal zone 2, e.g., the zone 1 or zone 3, is transmitted at the reduced frame rate that is one half of the normal frame rate. Because the gate scanning order switches in each frame, e.g., between up-to-down and down-to-up, the order of pieces of display data in the corresponding set of display data changes accordingly. For example, in each odd frame, because the gate scanning order is up-to-down, i.e., following the sequence of zone 1, zone 2, and zone 3, then the set of display data for the zone 1 is first transmitted, followed by the set of display data for the normal zone 2. In each even frame, because the gate scanning order is down-to-up, i.e., following the sequence of zone 3, zone 2, and zone 1, then the set of display data for the zone 3 is first transmitted, followed by the set of display data for the normal zone 2. The order of pieces of display data for each set of display data for the zone 1 is up-to-down, and the order of pieces of display data for each set of display data for the zone 3 is down-to-up. As to the set of display data for the normal zone 2, the order of pieces of display data switches between up-to-down and down-to-up.

Figure 17:
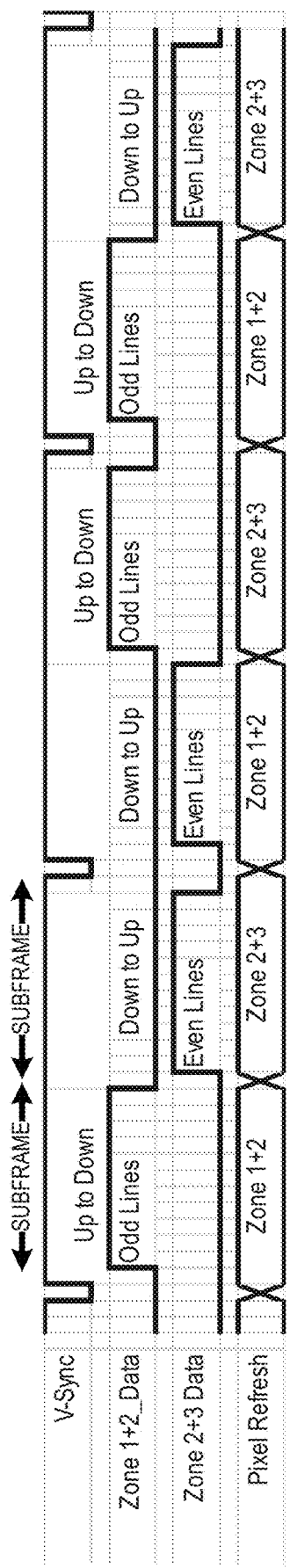
FIG. 17 is a timing diagram of still another example of transmitting and refreshing display data for different zones on a display panel shown in FIG. 14 at different frame rates in accordance with an embodiment.

In the exemplary timing diagrams shown in FIGS. 13, 15 and 16, the order of pieces of display data in each set of display data follows the consecutive order of the arrangement of rows of the array of pixels, e.g., row 1, row 2, row 3, . . . row n, or row n, row n−1, row n−2, . . . , row 1. It is to be appreciated that non-consecutive order may be used for arranging the pieces of display data in each set of display data in some embodiments to resolve the problems of unsynchronized display image in the column direction and display flicker caused by the leakage current of TFTs of pixel circuits. For example, as shown in FIG. 17, the set of display data for the normal zone 2 in transmitted at the normal frame rate, while the set of display data for the zone other than the normal zone 2, e.g., the zone 1 or zone 3, is transmitted at the reduced frame rate that is one half of the normal frame rate. Different from the exemplary timing diagrams shown in FIGS. 13, 15 and 16, in FIG. 17, the pixels in the odd rows (lines) of the zone 1 and normal zone 2 are transmitted following the gate scanning order of up-to-down (a first column direction) in a sub-frame of each frame. The pixels in the even rows of the zone 3 and the normal zone 2 are transmitted following the gate scanning order of down-to-up (a second column direction opposite to the first column direction) in another sub-frame of each frame. TABLE I below summarizes the gate scanning orders for the rows in each of the three zones 1, 2, and 3 in each frame, as illustrated in FIG. 17. The order of pieces of display data in the respective set of display data for each of the three zones 1, 2, and 3 in each frame is the same as the corresponding scanning order summarized in TABLE I.

TABLE I

| Zone | Frame-1 | | Frame-2 | | Frame-3 | | Frame-4 | |
|---|---|---|---|---|---|---|---|---|
| | U-to-D | D-to-U | D-to-U | U-to-D | U-to-D | D-to-U | D-to-U | U-to-D |
| 1 | Odd | | | Odd | Odd | | | Odd |
| 2 | Odd | Even | Even | Odd | Odd | Even | Even | Odd |
| 3 | | Even | Even | | | Even | Even | |

Figure 18:
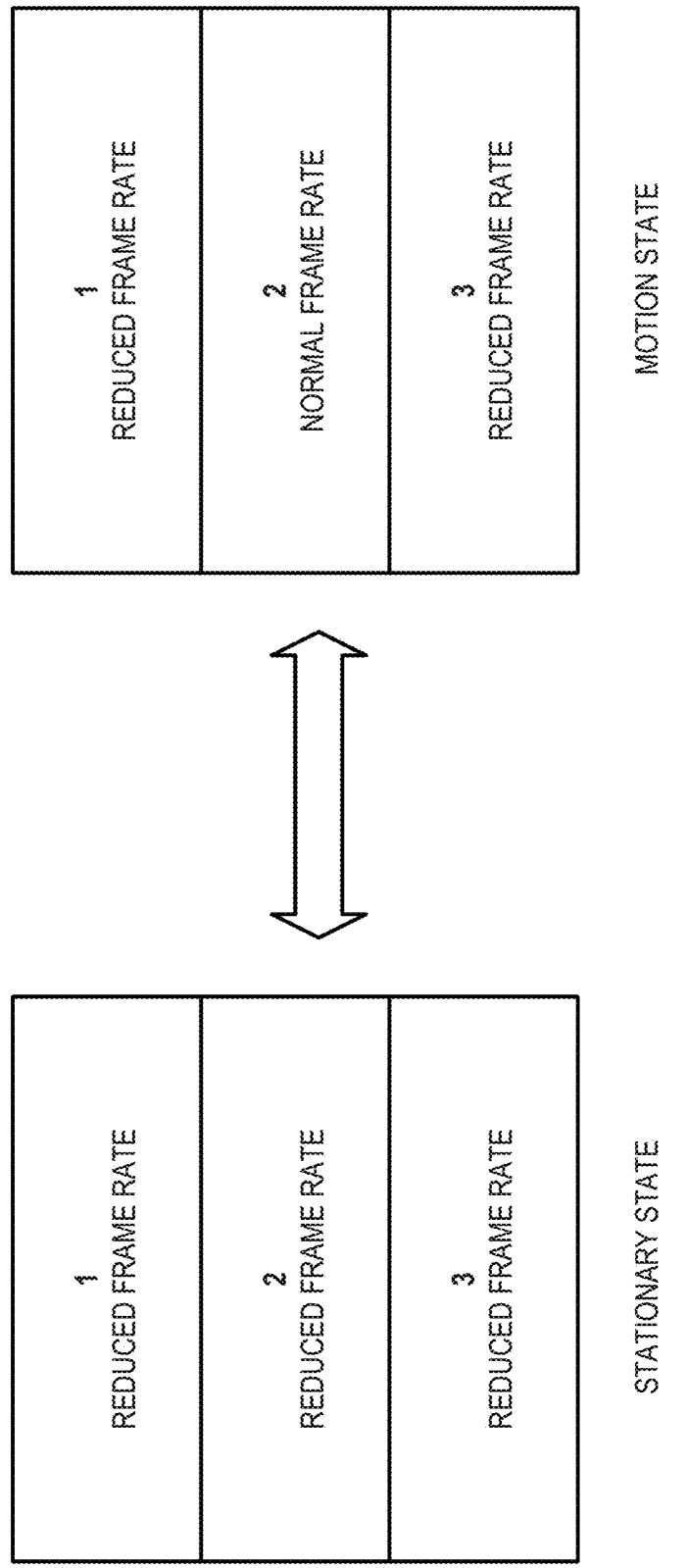
FIG. 18 is a depiction of an example of controlling frame rates for different zones on a display panel based on motion of a user in accordance with an embodiment.

In the exemplary timing diagrams shown in FIGS. 13 and 15-17, the frame rate at which each set of display data for the respective zone is transmitted from processor 114 to control logic 104 is fixed. It is to be appreciated that in some embodiments, the frame rate for any zone may be dynamically changed in response to reference signals. The reference signals may include, for example, the user's motion status determined by tracking module 606. For example, as shown in FIG. 18, each of the three zones 1, 2, and 3 (as divided in the example of FIG. 14) is associated with a respective frame rate. In this embodiment, in the stationary state, each of the three zones 1, 2, and 3 is associated with a reduced frame rate that is lower than the normal frame rate. The reduced frame rates for the three zones 1, 2, and 3 may be the same or different in different examples. In the motion state, the frame rate associated with the normal zone 2 may be returned to the normal frame rate, while each of the zones 2 and 3 is still associated with a reduced frame rate lower than the normal frame rate. It is to be appreciated that in some embodiments, for the zone 1 or zone 3, the associated reduced frame rate may be changed between the stationary state and the motion state. For example, the reduced frame rate for the zone 1 in the motion state may be higher than the reduced frame rate for the zone 1 in the stationary state even though both reduced frame rates are lower than the normal frame rate. The dynamic change of frame rate for each zone, in particular, the normal zone 2 can further improve the performance of display system 600 in the stationary state, for example, by reducing the power consumption of display 102 and preventing discontinuity of display images at the boundaries of different zones.

Figure 19:
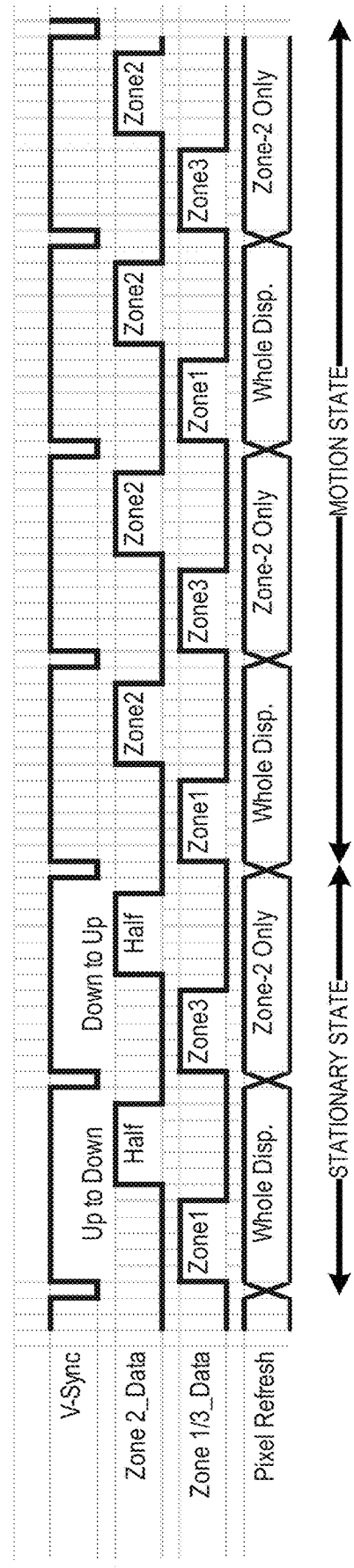
FIG. 19 is a timing diagram of an example of transmitting and refreshing display data for different zones on a display panel shown in FIG. 18 at different frame rates in accordance with an embodiment.

For example, as shown in FIG. 19, the stationary state and motion state may be determined based on the user's motion status. The three zones 1, 2, and 3 in this embodiment is divided based on the example shown in FIG. 14. In the motion state, the timing diagram is the same as that of the example in FIG. 15. In other words, when the user is in the motion state, the set of display data for the normal zone 2 is transmitted at the normal frame rate, while the set of display data for the zone other than the normal zone 2, e.g., the zone 1 or zone 3, is transmitted at the reduced frame rate that is one half of the normal frame rate.

In the stationary state, the frame rate for the set of display data for the zone other than the normal zone 2, e.g., the zone 1 or zone 3, is transmitted at the same reduced frame rate. As to the normal zone 2, the set of display data is transmitted at the reduced frame rate that is one half of the normal frame rate. Specifically, in each odd frame, display data for one half of the rows in the normal zone 2 (e.g., the top half of the rows in the column direction) is transmitted, while in each even frame, display data for the other half of the rows in the normal zone 2 (e.g., the bottom half of the rows in the column direction) is transmitted. That is, in each odd frame, display data for the top half of the entire rows of display panel 210 in the column direction (i.e., rows in the zone 1 and top half of the normal zone 2) is transmitted following the gate scanning order of up-to-down, and in each even frame, display data for the bottom half of the entire rows of display panel 210 in the column direction (i.e., rows in the zone 3 and bottom half of the normal zone 2) is transmitted following the gate scanning order of down-to-bottom.

In some embodiments, in the stationary state, in each alternate frame, display data for a portion of the rows in the normal zone 2 is transmitted, while in each another alternate frame, display data for the remaining portion of the rows in the normal zone is transmitted. Accordingly, a portion of the rows in the normal zone 2 are to be scanned in each alternate frame, while the remaining portion of the rows in the normal zone 2 are to be scanned in each another alternate frame. The portion may be one-half, such as in the example of FIG. 19. It is to be appreciated that the portion may be any fraction, such as one-third, one-fourth, one-fifth, etc. in other examples. The portion of rows may be not consecutive in some embodiments.

It is to be appreciated that in some embodiments, such as the ones with respect to FIGS. 15-17 and 19, the order of pieces of display data in a set of display data for a zone provided to control logic 104 may be different from the order in which the pieces of display data is generated by graphics pipeline 604 (and the order in which the pieces of display data is stored in the frame buffer). Any suitable display data reordering approaches may be applied by processor 114 to reorder the display data as desired. One example is disclosed in PCT Patent Application No. PCT/CN2016/103315, having a title "Apparatus and Method for Pixel Data Reordering," which is incorporated herein by reference.

Returning to FIG. 7, in some embodiments, for each zone, the amount of data in the respective set of display data and the frame rate may be both adjusted by pre-processing module 608 to further reduce the data bandwidth at the display interface and the power consumption of display 102. In one example, the normal zone and gazing zone described above may be separately determined on display panel 210. As described above, the normal zone may be used as the basis for adjusting the frame rates for different zones, and the gazing zone may be used as the basis for compressing the display data for different zones. Thus, by determining both the normal zone and gazing zone on the same display panel, the data bandwidth reduction effects caused by frame rate reduction and display data compression as described above may be combined.

Figure 20A:
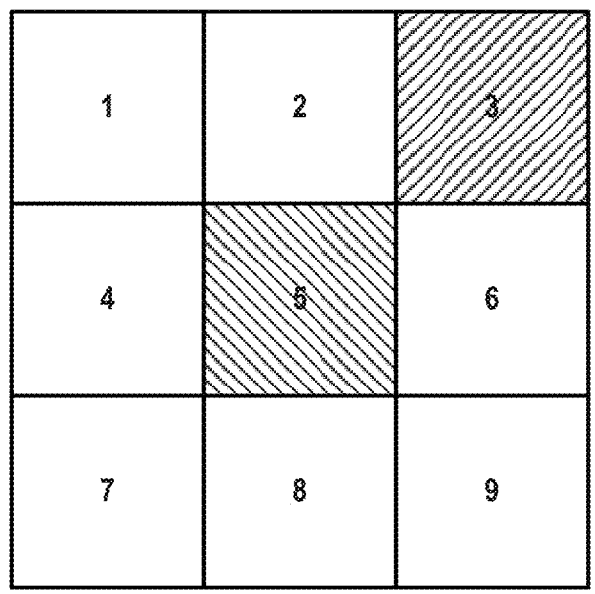
FIGS. 20A-20B are depictions of various examples of gazing zone(s) and normal zone(s) on a display panel in accordance with various embodiments.
Figure 20B:
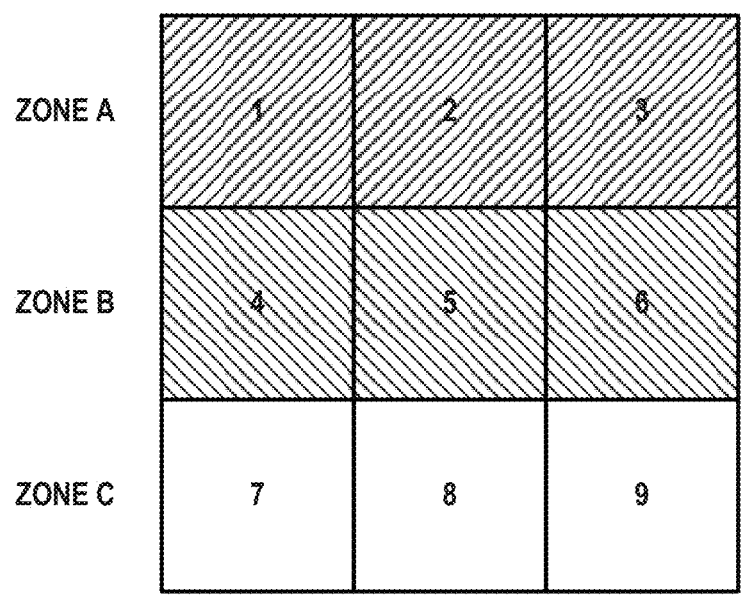

FIGS. 20A-20B are depictions of various examples of gazing zone(s) and normal zone(s) on a display panel in accordance with various embodiments. In FIG. 20A, the normal zone 5 is predetermined because the zone 5 is in the central region of display panel 210. Thus, the sets of display data for each zone other than the normal zone 5, i.e., the zones 1-4 and 6-9, may be transmitted at the reduced frame rates, while the set of display data for the normal zone 5 may be transmitted at the normal frame rate. At the same time, the gazing zone 3 may be determined by tracking module 606 based on the point-of-gaze of the user. Thus, the sets of display data for each zone other than the gazing zone 3, i.e., the zones 1, 2, and 4-9, may be compressed from the corresponding sets of original display data, while the set of display data for the gazing zone 3 may be uncompressed. Any suitable embodiments disclosed above with respect to zone-based display data processing and transmission may be applied to the example shown in FIG. 20A.

In some embodiments, each gazing zone and normal zone may be expanded to include all pixels in the entire rows for ease of designing the corresponding display panel as described above. In FIG. 20B, the normal zone is expanded from the zone 5 to all three zones 4-6 sharing the same rows (zone B), and the gazing zone is expanded from the zone 3 to all three zones 1-3 sharing the same rows (zone A). Any suitable embodiments disclosed above with respect to zone-based display data processing and transmission may be applied to the example shown in FIG. 20B. For example, the exemplary embodiment of zone-based display data processing and transmission with respect to FIGS. 14 and 17 and TABLE 1 may be modified for the example shown in FIG. 20B. TABLE II below summarizes the gate scanning orders for the rows in each of the zone A (including the gazing zones 1-3), zone B (including the normal zone 4-6), and zone C (including the zones 7-9) in each frame. The order of pieces of display data in the respective set of display data for each of the zones A, B, and C in each frame is the same as the corresponding gate scanning order summarized in TABLE II. As shown in TABLE II, for the zone C, the reduced frame rate is one half of the normal frame rate because the display data is transmitted in each alternate frame, e.g., even frames. The amount of data in each set of display data for the zone C is compressed to one half of the set of original display data because only display data for odd rows of pixels are transmitted. Compared with the zone C, the frame rate of the normal zone B is the normal frame rate because the set of display data is transmitted in each frame. The amount of display data in each set of display data for the gazing zone A is uncompressed because display data for even rows of pixels are transmitted as well. Compared with TABLE I, the average data bandwidth at the display interface and the power consumption of display 102 can be further reduced in this embodiment.

TABLE II

| Zone | Frame-1 | | Frame-2 | | Frame-3 | | Frame-4 | |
|---|---|---|---|---|---|---|---|---|
| | U-to-D | D-to-U | D-to-U | U-to-D | U-to-D | D-to-U | D-to-U | U-to-D |
| A | Odd | | | Even | Odd | | | Even |
| B | Odd | | Odd | | Odd | | Odd | |
| C | | | Odd | | | | Odd | |

In some embodiments, the normal zone and gazing zone may be merged into the same zone (gazing-normal zone). For example, the normal zone may not be predetermined, but instead is the same as the gazing zone that is determined by tracking module 606. In some embodiments, as a result, the average data bandwidth at the display interface and the power consumption of display 102 may be further reduced compared with the examples shown in FIGS. 20A-20B because more sets of display data (for more zones) can be compressed and transmitted at the reduced frame rates.

Figure 21A:
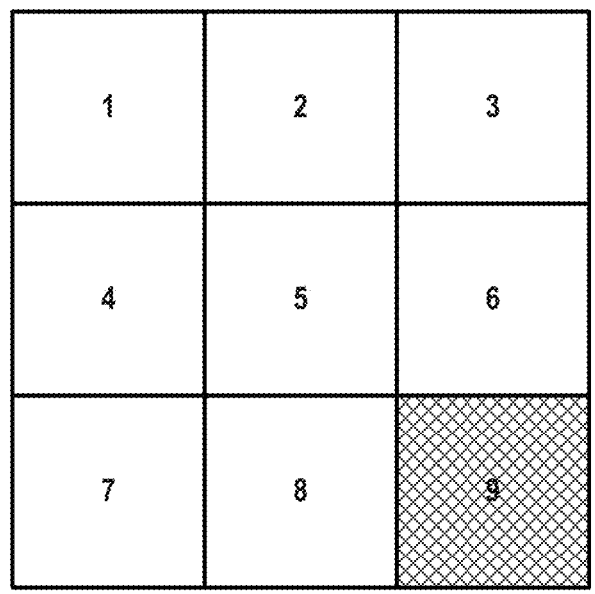
FIGS. 21A-21B are depictions of various examples of gazing-normal zone(s) on a display panel in accordance with various embodiments.
Figure 21B:
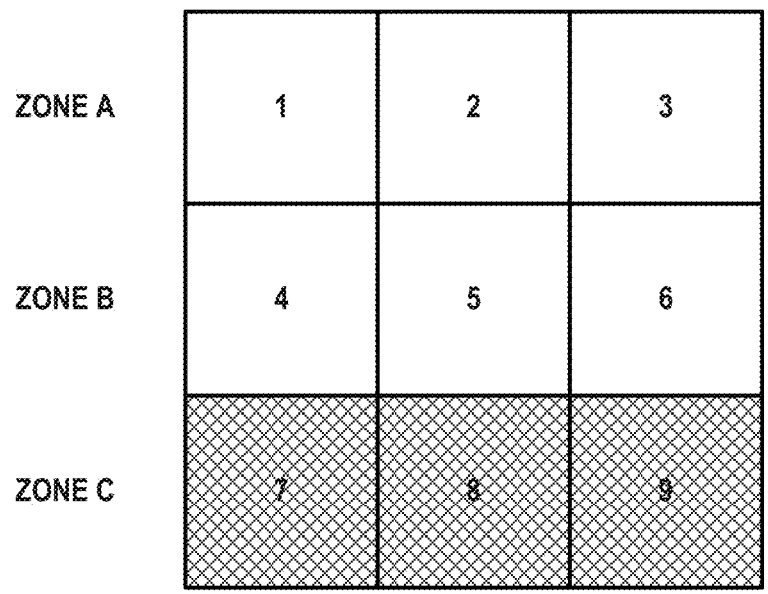

FIGS. 21A-21B are depictions of various examples of gazing-normal zone(s) on a display panel in accordance with various embodiments. In FIG. 21A, the zone 9 is determined by tracking module 606 as the gazing-normal zone based on the point-of-gaze of the user. Thus, the sets of display data for each zone other than the gazing-normal zone 9, i.e., the zones 1-8, may be compressed and transmitted at the reduced frame rates, while the set of display data for the gazing-normal zone 9 may be uncompressed and transmitted at the normal frame rate. Any suitable embodiments disclosed above with respect to zone-based display data processing and transmission may be applied to the example shown in FIG. 21A.

In some embodiments, the gazing-normal zone may be expanded to include all pixels in the entire rows for ease of designing the corresponding display panel as described above. In FIG. 21B, the gazing-normal zone is expanded from the zone 9 to all three zones 7-9 sharing the same rows (zone C). Any suitable embodiments disclosed above with respect to zone-based display data processing and transmission may be applied to the example shown in FIG. 21B. For example, the exemplary embodiment of zone-based display data processing and transmission with respect to FIGS. 14 and 17 and TABLE 1 may be modified for the example shown in FIG. 21B. TABLE III below summarizes the gate scanning orders for the rows in each of the zone A (including the zones 1-3), zone B (including the zone 4-6), and zone C (including the gazing-normal zones 7-9) in each frame. The order of pieces of display data in the respective set of display data for each of the zones A, B, and C in each frame is the same as the corresponding gate scanning order summarized in TABLE III. As shown in TABLE III, for the gazing-normal zone C, the frame rate is the normal frame rate, and the amount of the display data is not compressed. Compared with the gazing-normal zone C, both the frame rate and the amount of display data for each of the zone A and zone B are reduced. Compared with TABLE II, the average data bandwidth at the display interface and the power consumption of display 102 can be further reduced in this embodiment.

TABLE III

| Zone | Frame-1 | | Frame-2 | | Frame-3 | | Frame-4 | |
|---|---|---|---|---|---|---|---|---|
| | U-to-D | D-to-U | D-to-U | U-to-D | U-to-D | D-to-U | D-to-U | U-to-D |
| A | Odd | | | | Odd | | | |
| B | Odd | | | | Odd | | | |
| C | Odd | Even | Odd | Even | Odd | Even | Odd | Even |

Referring back to FIG. 6, control logic 104 in this embodiment is operatively coupled to processor 114 and display 102 and configured to provide control signals 108 for driving display 102 based on stream of display data 106 received from processor 114. Control logic 104 may be an integrated circuit (but may alternatively include a state machine made of discrete logic and other components), which provides an interface function between processor 114 and display 102. Control logic 104 may provide various control signals 108 with suitable voltage, current, timing, and de-multiplexing, to control display 102 to show the desired text or image. Control logic 104 may be an application-specific microcontroller and may include storage units such as RAM, flash memory, EEPROM, and/or ROM, which may store, for example, firmware and display fonts.

In this embodiment, control logic 104 includes a data receiver 612 and a post-processing module 614. It is to be appreciated that control logic 104 may include any suitable additional components.

In this embodiment, data receiver 612 is configured to receive stream of display data 106 from data transmitter 610 of processor 114. Data receiver 612 may be any suitable display interface between processor 114 and control logic 104, such as but not limited to DSI, DPI, and DBI by the MIPI Alliance, UDI, DVI, and DP. As described above, in some embodiments, control data and status information, such as information related to the division of the array of pixels into zones and information related to the pre-processing processes performed on the display data (e.g., display data compression and/or frame rate reduction) may be received by data receiver 612 from data transmitter 610 as well. It is to be appreciated that processor 114 and control logic 104 in this embodiment are two discrete components of display system 600, for example, in two separate chip packages. Control logic 104 in this embodiment is not an internal component as part of processor 114. Thus, data transmitter 610 of processor 114 transmits stream of display data 106 to data receiver 612 of control logic 104 via a display interface, such as but not limited to DSI, DPI, and DBI by the MIPI Alliance, UDI, DVI, and DP.

In this embodiment, post-processing module 614 is operatively coupled to data receiver 612 and configured to process received stream of display data 106 and generate control signals 108 based on stream of display data 106. In some embodiments, pre-processing module 608 may be operatively coupled to tracking module 606 and process the set of original display data for the gazing zone (or normal zone) differently from the sets of original display data for each zone other than the gazing zone (or normal zone). In some embodiments, if stream of display data 106 includes one or more sets of compressed display data, then post-processing module 614 may recover each set of compressed display data for the respective zone (e.g., each zone other than the gazing zone) to generate the corresponding set of recovered display data. In each frame, the set of recovered display data is updated and used for rendering the pixels in the respective zone on display panel 210. In some embodiments, if stream of display data 106 includes one or more sets of display data transmitted at the reduced frame rates (e.g., for zones other than the normal zone), then post-processing module 614 may generate control signals 108 based on stream of display data 106, which cause the pixels in the respective zone to be refreshed based on the corresponding reduced frame rate.

Figure 8:
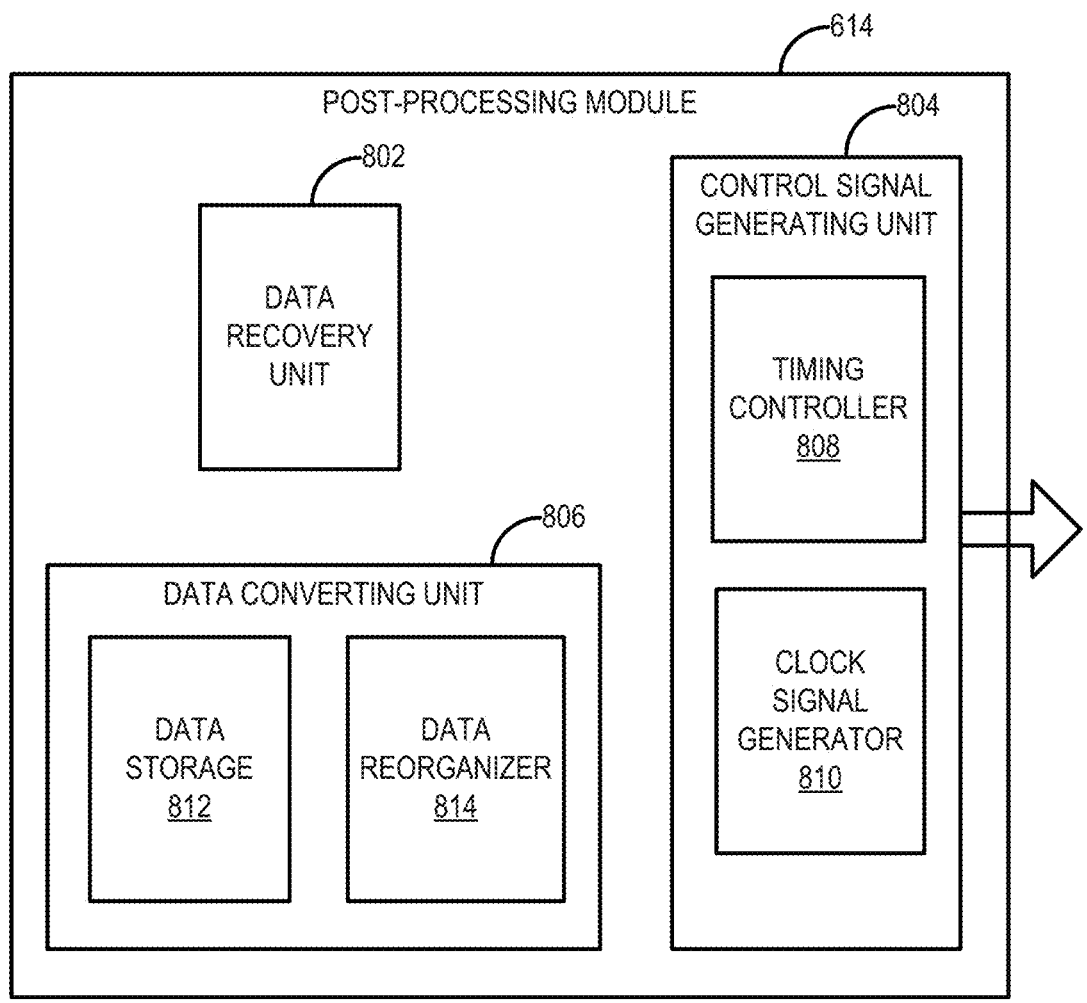
FIG. 8 is a detailed block diagram illustrating one example of a post-processing module in the control logic shown in FIG. 6 in accordance with an embodiment.

FIG. 8 is a detailed block diagram illustrating one example of post-processing module 614 in control logic 104 shown in FIG. 6 in accordance with an embodiment. In this embodiment, post-processing module 614 includes data recovery unit 802, control signal generating unit 804, and data converting unit 806. In this embodiment, data recovery unit 802 is configured to recover each set of compressed display data to generate the corresponding set of recovered display data based on the down-sampling, data compression, data truncation, or any other approaches that are used by pre-processing module 608 for compressing the corresponding set of original display data. As described above, information related to the compression of display data, e.g., the specific algorithms and parameters used by pre-processing module 608 for each set of compressed display data, may be transmitted to control logic 104 as well and utilized by data recovery unit 802. It is to be appreciated that depending on the specific approaches used by pre-processing module 608, the recovery may be lossless compression/recovery, i.e., the set of recovered display data is the same as the corresponding set of original display data, or lossy compression/recovery, i.e., the set of recovered display data is approximate to, but not the same as the corresponding set of original display data.

Figure 10B:
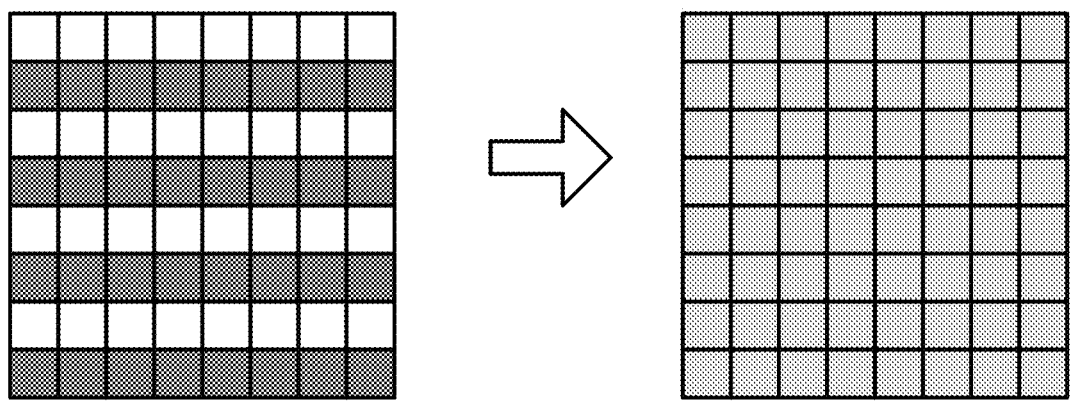
Figure 11B:
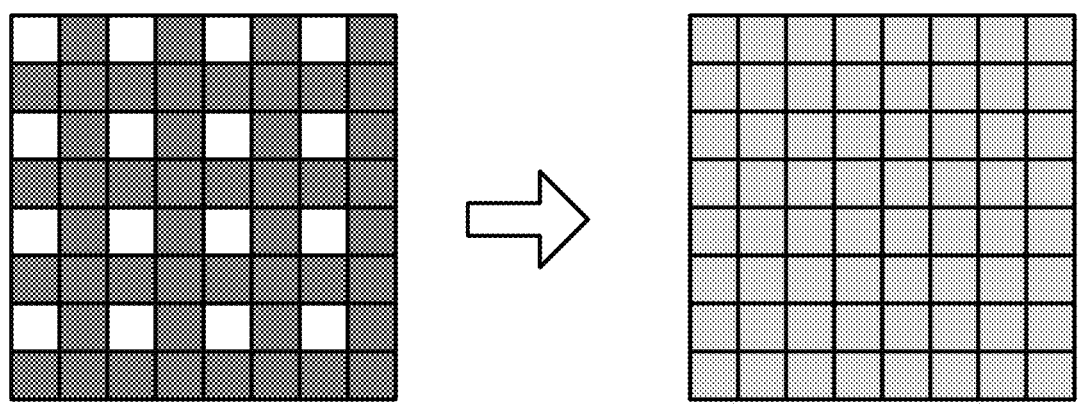

Turning to FIGS. 10B and 11B, in the examples described above regarding down-sampling, the recovery of down-sampled display data may be performed by energy averaging approaches so that the brightness for each pixel represented in the recovered display data is the average of the sum of brightness of each pixel that is persevered in the set of compressed display data. As shown in FIGS. 10B and 11B, because the pixels persevered in the set of compressed display data in FIG. 10B (i.e., one half of the total pixels in the zone) are more than the pixels persevered in the set of compressed display data in FIG. 11B (i.e., one-fourth of the total pixels in the same zone), the average brightness of each pixel in FIG. 10 B is higher than the average brightness of each pixel in FIG. 11B. In some embodiments, any suitable scaling-up approaches, such as duplicate algorithm, linear algorithm, etc., may be used to recover the display data compressed by down-sampling.

As described above, in some embodiments, a set of display data may be compressed by data compression unit 704 using any suitable data encoding algorithms. Accordingly, data recovery unit 802 may recover the corresponding set of compressed data by the suitable decoding algorithm corresponding to the encoding algorithm used by data compression unit 704, such as VESA DSC algorithm, various Huffman coding algorithms, RLE algorithm, or differential pulse code modulation DPCM algorithm. In some embodiments, a set of display data may be compressed by data truncation unit 706 using any suitable data truncation approaches. Accordingly, data recovery unit 802 may recover the corresponding set of compressed data by supplementing arbitrary or estimated bit(s). It is to be appreciated that as the compression of display data can be performed at the zone level, i.e., different sets of display data for different zones may be compressed differently, the recovery of the compressed display data may be performed by data recovery unit 802 at the zone level as well, i.e., applying suitable recovery approach for each set of compressed display data.

Referring back to FIG. 8, in this embodiment, control signal generating unit 804 includes a timing controller (TCON) 808 and a clock signal generator 810. TCON 808 may provide a variety of enable signals to drivers 602 of display 102. Clock signal generator 810 may provide a variety of clock signals to drivers 602 of display 102. As described above, control signals 108, including the enable signals and clock signals, can control gate scanning driver 304 to scan corresponding rows of pixels according to a gate scanning order and control source writing driver 306 to write each set of display data according to the order of pieces of display data in the set of display data. In other words, control signals 108 can cause the pixels in each zone to be refreshed following a certain order at a certain rate. As described below in detail, the order and rate of refreshing the pixels in each zone may be determined by control signal generating unit 804 based on the frame rate (either the reduced frame rate or normal frame rate) at which the corresponding set of display data is received by control logic 104.

In this embodiment, data converting unit 806 may arrange the order of pieces of display data in each set of display data according to a desired gate scanning order. Data converting unit 806 may include a data storage 812 and a data reorganizer 814. Data storage 812 may be data latches that temporally store display data. Data reorganizer 814 may reconstruct, in each frame, display data based on the desired gate scanning order. As described below, data converting unit 806 may not be needed in some embodiments depending on the desired gate scanning order.

Referring now to FIG. 13, in this embodiment, control signals 108 generated by control signal generating unit 804 cause the pixels in the normal zone 2 to be refreshed in each frame, i.e., at the normal frame rate. As to the pixels in the zone 1 or zone 3, control signals 108 generated by control signal generating unit 804 cause the pixels to be refreshed once the sets of display data for all three zones 1, 2, and 3 are received. That is, in each alternate frame when the three sets of display data for all three zones 1, 2, and 3 have been received (labeled as "Whole Disp." for Pixel Refresh), the pixels in each of the three zones 1, 2, and 3 are refreshed. In each another alternate frame (labeled as "Zone-2 Only"), only the pixels of the normal zone 2 are refreshed based on the set of display data for the normal zone 2 received in the same frame, and the pixels in the zone 1 or zone 3 are not refreshed until the next frame. As a result, the pixels in the zone 1 or zone 3 are refreshed in each alternate frame, i.e., at the reduced frame rate that is one-half of the normal frame rate.

It is to be appreciated that in this embodiment, the pixel refresh of the zone 3 is not synchronized with the display data transmission of the set of display data for the zone 3 in each frame. That is, once a set of display data for the zone 3 is received, the pixels in the zone 3 are not refreshed in the same frame, but instead are refreshed in the next frame. In some embodiments, the set of display data for the zone 3 may be held in data storage 812 of data converting unit 806 and provided to display 102 according to the timing diagram of FIG. 13 as controlled by data reorganizer 814. In this embodiment, because the pixels of the whole display panel are refreshed together in each alternate frame, the problem of unsynchronized display images in the column direction can be eased.

Referring now to FIG. 15, in this embodiment, control signals 108 generated by control signal generating unit 804 cause the pixels in the normal zone 2 to be refreshed in each frame, i.e., at the normal frame rate. Different from the example in FIG. 13 in which the rows of pixels in the normal zone 2 are scanned in the same column direction in each frame, in FIG. 15, control signals 108 cause the rows in the normal zone 2 to be scanned in a first column direction (e.g., up-to-down) in each alternate frame (e.g., each odd frame) and cause the rows in the normal zone 2 to be scanned in a second column direction opposite to the first column direction (e.g., down-to-up) in each another alternate frame (e.g., each even frame).

As to the pixels in the zone 1 or zone 3, control signals 108 generated by control signal generating unit 804 cause the pixels to be refreshed once the sets of display data for all three zones 1, 2, and 3 are received. That is, in each alternate frame when the three sets of display data for all three zones 1, 2, and 3 have been received (labeled as "Whole Disp." for Pixel Refresh), the pixels in each of the three zones 1, 2, and 3 are refreshed. In each another alternate frame (labeled as "Zone-2 Only"), only the pixels of the normal zone 1 are refreshed based on the set of display data for the zone 1 received in the same frame, and the pixels in the zone 1 or zone 3 are not refreshed until the next frame. As a result, the pixels in the zone 1 or zone 3 are refreshed in each alternate frame, i.e., at the reduced frame rate that is one-half of the normal frame rate. Different from the example in FIG. 13 in which the rows of pixels in the zone 1 and zone 3 are scanned in the same column direction, in FIG. 15, control signals 108 cause the rows in the zone 1 to be scanned in a first column direction (e.g., up-to-down) in each alternate frame (e.g., each odd frame) and cause the rows in the zone 3 to be scanned in a second column direction opposite to the first column direction (e.g., down-to-up) in each another alternate frame (e.g., each even frame).

Referring now to FIG. 16, in this embodiment, control signals 108 generated by control signal generating unit 804 cause the pixels in the normal zone 2 to be refreshed in each frame, i.e., at the normal frame rate. As to the pixels in the zone 1 or zone 3, control signals 108 generated by control signal generating unit 804 cause the pixels to be refreshed once the corresponding set of display data for the respective zone 1 or zone 3 is received. That is, the pixels in the zone 1 are refreshed in the same frame (labeled as "Zone 1+2") in which the corresponding set of display data for the zone 1 is received, and the pixels in the zone 3 are refreshed in the same frame (labeled as "Zone 2+3") in which the corresponding set of display data for the zone 3 is received. As a result, the pixels in the zone 1 or zone 3 are refreshed in each alternate frame, i.e., at the reduced frame rate that is one-half of the normal frame rate. In this embodiment, as the pixel refresh for each zone is synchronized with the display data transmission of the corresponding set of display data, data converting unit 806 may not be needed to hold the display data.

Referring now to FIG. 17, in this embodiment, control signals 108 generated by control signal generating unit 804 cause the pixels of odd rows in the normal zone 2 to be refreshed in one sub-frame of each frame and cause the pixels of even rows in the normal zone 2 to be refreshed in one sub-frame of each frame. As to the pixels in the zone 1 or zone 3, control signals 108 generated by control signal generating unit 804 cause the pixels of odd rows to be refreshed in one sub-frame of each alternate frame and cause the pixels of even rows to be refreshed in one sub-frame of each another alternate frame. In this example, the pixel refresh for each zone is synchronized with the display data transmission of the corresponding set of display data, similar to the example in FIG. 16. It is to be appreciated that in some embodiments, the pixel refresh for the zone 1 and/or zone 3 may be unsynchronized with the display data transmission of the corresponding set of display data, similar to the example in FIG. 15. In this embodiment, because the gate scanning order is not a consecutive order for the rows of pixels, data converting unit 806 may be used to reorder the display data to accommodate the desired gate scanning order. Moreover, in some embodiments, drivers 602 and scan and data lines connecting drivers 602 and display panel 210 may be designed to accommodate the desired gate scanning order as well. One example of designing data converting unit 806 and drivers 602 is disclosed in PCT Patent Publication Application No. WO2016/141777, having a title "Display Device and Pixel Circuit Thereof," which is incorporated herein by reference. It is to be appreciated that non-consecutive gate scanning order disclosed in this embodiment can resolve the problems of unsynchronized display image in the column direction and display flicker caused by the leakage current of TFTs of pixel circuits.

Referring now to FIGS. 18 and 19, in this embodiment, the frame rate associated with each zone may be dynamically changed in response to reference signals, such as the user's motion status. Assuming the array of pixels on display panel 210 shown in FIG. 18 includes 100 rows, each of which is connected to one of 100 scan lines S0-S99 arranged in the column direction from the top to the bottom of display panel 210. In this example, the normal zone 2 includes rows 26-75 corresponding to scan lines S25-S74, the zone 1 includes rows 1-25 corresponding to scan lines S0-S24, and the zone 3 includes rows 76-100 corresponding to scan lines S75-S99. Control signals 108 generated by control signal generating unit 804 can cause pixels in each of the three zones 1, 2, and 3 to be refreshed at either 60 fps or 120 fps based on a normal frame rate of 120 fps as summarized in TABLE IV below. The "Refresh Mode" column includes various modes of setting the frame rate associated with each of the three zones 1, 2, and 3: normal frame rate of 120 fps for all the three zones 1, 2, and 3 (whole), reduced frame rate of 60 fps for all the three zones 1, 2, and 3 (whole), and normal frame rate of 120 fps for the normal zone 2 and reduced frame rate of 60 fps for the zones 1 and 3. The "Gate Scan Scheme" columns illustrate one or more examples of gate scanning order in each frame for each of the refresh modes. It is to be appreciated that for some refresh modes, e.g., "Zone 2=120 fps and Zone 1/3=60 fps" and "Whole=60 fps," more than one gate scan scheme may be applied to achieve the same gate scan result. It is to be appreciated that in some embodiments, the gate scanning direction in frames 1 and 2 and the gate scanning direction in frames 3 and 4 may be opposite to one another, i.e., reversing the gate scanning direction, in order to prevent display flicker.

The rate at which a pixel is refreshed may be affected by two factors: the gate scanning rate and the display data updating rate. Thus, control signals 108 generated by control signal generating unit 804 may control at least one of the two factors in order to control the pixel refresh rate. In one example, control signals 108 can cause the pixels in any zone to be scanned at the normal frame rate, i.e., by setting the gate scanning rate the same as the normal frame rate for each zone. On the other hand, control signals 108 can cause the set of display data for each zone to be written to the pixels in the respective zone at the corresponding frame rate, i.e., controlling the display data updating rate based on the specific frame rate (either normal frame rate or reduced frame rate) for each zone. In this way, the pixel refreshed rate can still be controlled at the zone level based on the respective frame rate. Since the gate scanning rate for each zone is the same as the normal frame rate, the design of gate scanning driver 304 and scan lines can be simplified. In another example, control signals 108 can cause the pixels in each zone to be scanned at the respective frame rate, i.e., by controlling the gate scanning rate based on the specific frame rate (either normal frame rate or reduced frame rate) for each zone. On the other hand, control signals 108 can cause the set of display data for each zone to be written to the pixels in the respective zone at the corresponding frame

TABLE IV

| Refresh Mode | Gate Scan Scheme | | | | Gate Scan Result |
|---|---|---|---|---|---|
| | Frame-1 | Frame-2 | Frame-3 | Frame-4 | |
| Whole = 120 fps | S0→S99 | S0→S99 | S0→S99 | S0→S99 | S0~S99 = 120 Hz |
| Zone 2 = 120 fps Zone 1/3 = 60 fps | S0→S74 | S24→S99 | S0→S74 | S24→S99 | S0~S24 & S75~S99 = 60 Hz S25~S74 = 120 Hz |
| Zone 2 = 120 fps Zone 1/3 = 60 fps | S0→S74 | S24→S99 | S74→S0 | S99→S24 | S0~S24 & S75~S99 = 60 Hz S25~S74 = 120 Hz |
| Zone 2 = 120 fps Zone 1/3 = 60 fps | S0→S74 | S99→S24 | S0→S74 | S99→S24 | S0~S24 & S75~S99 = 60 Hz S25~S74 = 120 Hz |
| Zone 2 = 120 fps Zone 1/3 = 60 fps | S0→S74 | S99→S24 | S74→S0 | S24→S99 | S0~S24 & S75~S99 = 60 Hz S25~S74 = 120 Hz |
| Whole = 60 fps | S0→S49 | S50→S99 | S0→S49 | S50→S99 | S0~S99 = 60 Hz |
| Whole = 60 fps | S0→S49 | S99→S50 | S49→S0 | S50→S99 | S0~S99 = 60 Hz |
| Whole = 60 fps | S0→S49 | S99→S50 | S0→S49 | S99→S50 | S0~S99 = 60 Hz |
| Whole = 60 fps | S0→S49 | S99→S50 | S49→S0 | S50→S99 | S0~S99 = 60 Hz |

In some embodiments, a higher normal frame rate (240 fps) may be used, and control signals 108 generated by control signal generating unit 804 can cause pixels in each of the three zones 1, 2, and 3 to be refreshed at either 60 fps or 120 fps based on the normal frame rate of 240 fps as summarized in TABLE V below. As shown in TABLE V, control signals 108 may cause that only one half of the rows (e.g., odd rows or even rows) are scanned in each frame to further reduce the frame rate from the normal frame rate.

rate, i.e., by controlling the display data updating rate based on the specific frame rate (either normal frame rate or reduced frame rate) for each zone. Since the gate scanning rate can be reduced for at least some zones (e.g., the zones other than the normal zone), the power consumption of display 102 can be further reduced.

In some embodiments, control signals 108 may cause the pixels in the normal zone to be scanned at the normal frame rate and cause the set of display data for the normal zone to be written to the pixels in the normal zone at the normal frame rate. As to the zones other than the normal zone, in

TABLE V

| Refresh Mode | Gate Scan Scheme | | | | Gate Scan Result |
|---|---|---|---|---|---|
| | Frame-1 | Frame-2 | Frame-3 | Frame-4 | |
| Whole = 120 fps | S0→S2→ S4→ . . . →S98 | S1→S3→ S5→ . . . →S99 | S0→S2→ S4→ . . . →S98 | S1→S3→ S5→ . . . →S99 | S0~S99 = 120 Hz |
| Zone 2 = 120 fps Zone 1/3 = 60 fps | S0→S2→ S4→ . . . →S74 | S1→S3→ S5→ . . . →S75 | S24→S26→ S28→ . . . →S98 | S25→S27→ S29→ . . . →S99 | S0~S24 & S75~S99 = 60 Hz S24~S74 = 120 Hz |
| Whole = 60 fps | S0→S2→ S4→ . . . →S48 | S1→S3→ S5→ . . . →S49 | S50→S52→ S54→ . . . →S98 | S51→S53→ S55→ . . . →S99 | S0~S99 = 60 Hz | some embodiments, control signals 108 may cause the pixels to be scanned at the normal frame rate and cause the corresponding set of display data to be written to the pixels at the corresponding reduced frame rate. As a result, the pixels are still refreshed based on the reduced frame rate as limited by the display data updating rate. In some embodiments, control signals 108 may cause the pixels in each zone other than the normal zone to be scanned at the corresponding reduced frame rate and cause the corresponding set of display data for each zone other than the normal zone to be written to the pixels in the zone other than the normal zone at the corresponding reduced frame rate. That is, the pixels are refreshed based on the reduced frame rate as limited by both the gate scanning rate and display data updating rate.

As described above, the normal zone may be either predetermined and fixed or dynamically determined by tracking module 606 and can be changed in response to the change of the user's point-of-gaze. In other words, each zone other than the normal zone may be fixed or changed. In some embodiments, if the zones other than the normal zone are fixed, then both the gate scanning rate and display data updating rate for each zone other than the normal zone may be controlled based on the reduced frame rate to further reduce the power consumption of display 102. If the zones other than the normal zone are not fixed, then only the display data updating rate for each zone other than the normal zone may be controlled based on the reduced frame rate (the gate scanning rate is kept the same as the normal frame rate) to reduce the design complexity of gate scanning driver 304 and scan lines.

Referring back to FIG. 6, in this embodiment, display 102 includes display panel 210 and one or more drivers 602, such as light emitting driver 302, gate scanning driver 304, and source writing driver 306. Display panel 210 has an array of pixels divided into at least a first zone and a second zone. Each zone may be associated with a plurality of display attributes, such as pixel refresh rate, display resolution, and PPI. In some embodiments, the first zone may be in a substantially circular shape, and the second zone may be in a substantially ring shape. For example, the first and second zones may be concentric. It is to be appreciated that the first and second zones may be in any other shapes in other examples, such as rectangular or square shape. In some embodiments, the first and second zones may have substantially the same shape and size. In some embodiments, the division of the array of pixels may be dynamically determined based on any suitable reference signals, such as but not limited to the user's motion status. In some embodiments, the first zone may be a gazing zone determined by tracking module 606 of processor 114 based on the point-of-gaze of the user. In some embodiments, the first zone may be a gazing zone because the center of the first zone is closer to the center of display panel 210 than that of the second zone. In other words, the first zone may be predetermined as the gazing zone since it is in the central region of display panel 210.

In this embodiment, drivers 602 are operatively coupled to display panel 210 and configured to receive control signals 108 from control logic 104 and drive the array of pixels on display panel 210 based on control signals 108, so that a first value of a display attribute associated with the first zone is different from a second value of the same display attribute associated with the second zone. That is, as controlled by control logic 104 via control signals 108, drivers 602 can drive the pixels at the zone level to partially update the array of pixels as described in any embodiments disclosed herein. As a result, the first bit rate per pixel (first average bandwidth per pixel) of receiving display data for the first zone by display 102 or control logic 104 is higher than a second bit rate per pixel (second average bandwidth per pixel) of receiving display data for the second zone by display 102 or control logic 104. In some embodiments, if the first and second zones include the same number of pixels, then the first bit rate is higher than the second bit rate. Accordingly, the zone-based display data processing and transmission disclosed herein can reduce the average data bandwidth at the display interface.

In some embodiments, the display attribute may be pixel refresh rate, and the second bit rate per pixel for the second zone (e.g., non-gazing zone) may be reduced compared with the first bit rate per pixel for the first zone (e.g., gazing zone) by reducing the frame rate at which the display data is transmitted. In some embodiments, the display attribute may be display resolution or PPI, and the second bit rate per pixel may be reduced compared with the first bit rate per pixel by reducing the amount of data in the set of display data transmitted in each frame. In some embodiments, the display attributes may include both pixel refresh rate and display resolution/PPI, and the second bit rate per pixel may be reduced compared with the first bit rate per pixel by reducing both the amount of data in the set of display data transmitted in each frame and the frame rate at which the display data is transmitted.

From the user's perspective, the first and second zones may exhibit different display properties, such as refresh rate, display resolution, and PPI. For example, the first zone, as the gazing zone, may exhibit the normal display refresh rate, normal display resolution, and normal PPI, while the second zone may exhibit the reduced display refresh rate, reduced display resolution, or reduced PPI. As described above, as human vision is more sensitive to the display images in a limited FOV (e.g., 50 degrees), the user experience may not be affected by changing display properties in the zones outside the gazing zone. On the other hand, by reducing refresh rate, display resolution, and/or PPI in the zones outside the gazing zone, the data bandwidth at the display interface and power consumption of display 102 can be reduced.

In some embodiments, the display properties for each zone on display panel 210 may be dynamically changed in response to any suitable reference signals, such as the user's motion status. In some embodiments, the first value of the display attribute associated with the first zone is different from the second value of the display attribute associated with the second zone only when the motion of the user exceeds a threshold (e.g., in the motion state). Otherwise, the first and second zones may exhibit the same display properties (e.g., in the stationary state).

In some embodiments, the array of pixels on display panel 210 may be further divided to have a third zone, and drivers 602 may be configured to drive the array of pixels so that a third value of the display attribute associated with the third zone is different from the first and second values for the first and second zones, respectively. As described above, the first zone may be the gazing zone, and the second and third zones may be non-gazing zones. Between the non-gazing zones, the second and third zones may exhibit different display properties as well. For example, if the second zone is closer to the first zone than the third zone, then the third bit rate per pixel (third average bandwidth per pixel) of receiving display data for the third zone by display 102 or control logic 104 may be lower than the second bit rate per pixel for the second zone because human vision is least sensitive to the third zone.

Figure 22:
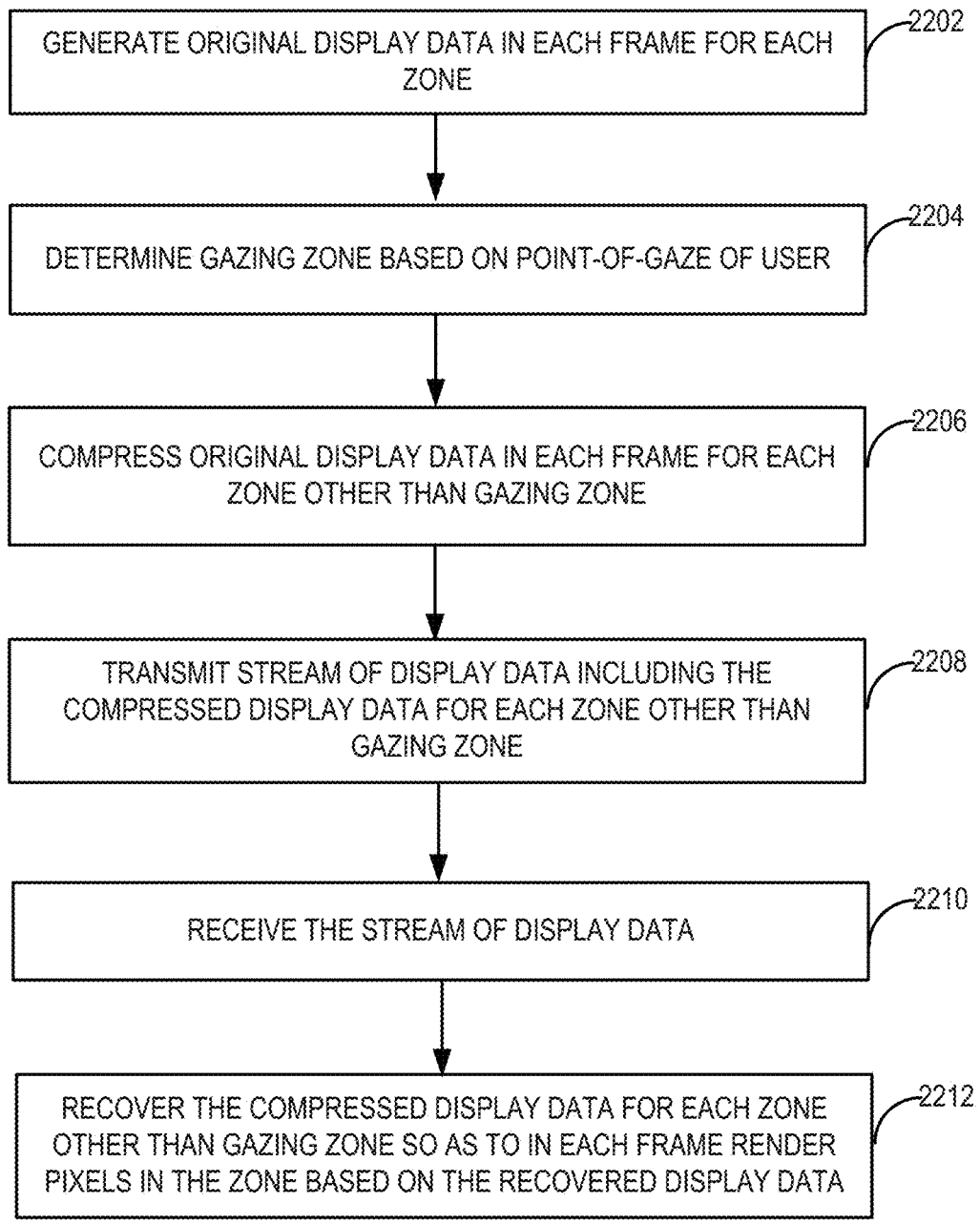
FIG. 22 is a flow chart of a method for providing display data and control signals for driving a display having an array of pixels divided into a plurality of zones in accordance with an embodiment.

FIG. 22 is a flow chart of a method for providing display data and control signals for driving a display having an array of pixels divided into a plurality of zones in accordance with an embodiment. It will be described with reference to the above figures. However, any suitable circuit, logic, unit, or module may be employed. The method can be performed by any suitable circuit, logic, unit, or module that can comprise hardware (e.g., circuitry, dedicated logic, programmable logic, microcode, etc.), software (e.g., instructions executing on a processing device), firmware, or a combination thereof. It is to be appreciated that not all steps may be needed to perform the disclosure provided herein. Further, some of the steps may be performed simultaneously, or in a different order than shown in FIG. 22, as will be understood by a person of ordinary skill in the art.

Starting at 2202, a set of original display data is generated in each frame for each zone of the plurality of zones. This may be performed by graphics pipelines 604 of processor 114. At 2204, a gazing zone is determined based on a point-of-gaze of the user. This may be performed by tracking module 606 of processor 114. At 2206, the set of original display data in each frame for each zone other than the gazing zone is compressed to reduce the amount of display data in the set of original display data in each frame. The compression of display data may be achieved by down-sampling, data compression, and/or data truncation. This may be performed by pre-processing module 608 of processor 114. At 2208, a stream of display data including the sets of compressed display data for each zone other than the gazing zone is transmitted. This may be performed by data transmitter 610 of processor 114.

Proceeding to 2210, the stream of display data including the sets of compressed display data transmitted at 2208 is received. This may be performed by data receiver 612 of control logic 104. At 2212, the set of compressed display data for each zone other than the gazing zone is recovered so as to, in each frame, render the pixels in the respective zone based on the corresponding set of recovered display data. This may be performed by post-processing module 614 of control logic 104.

Figure 23:
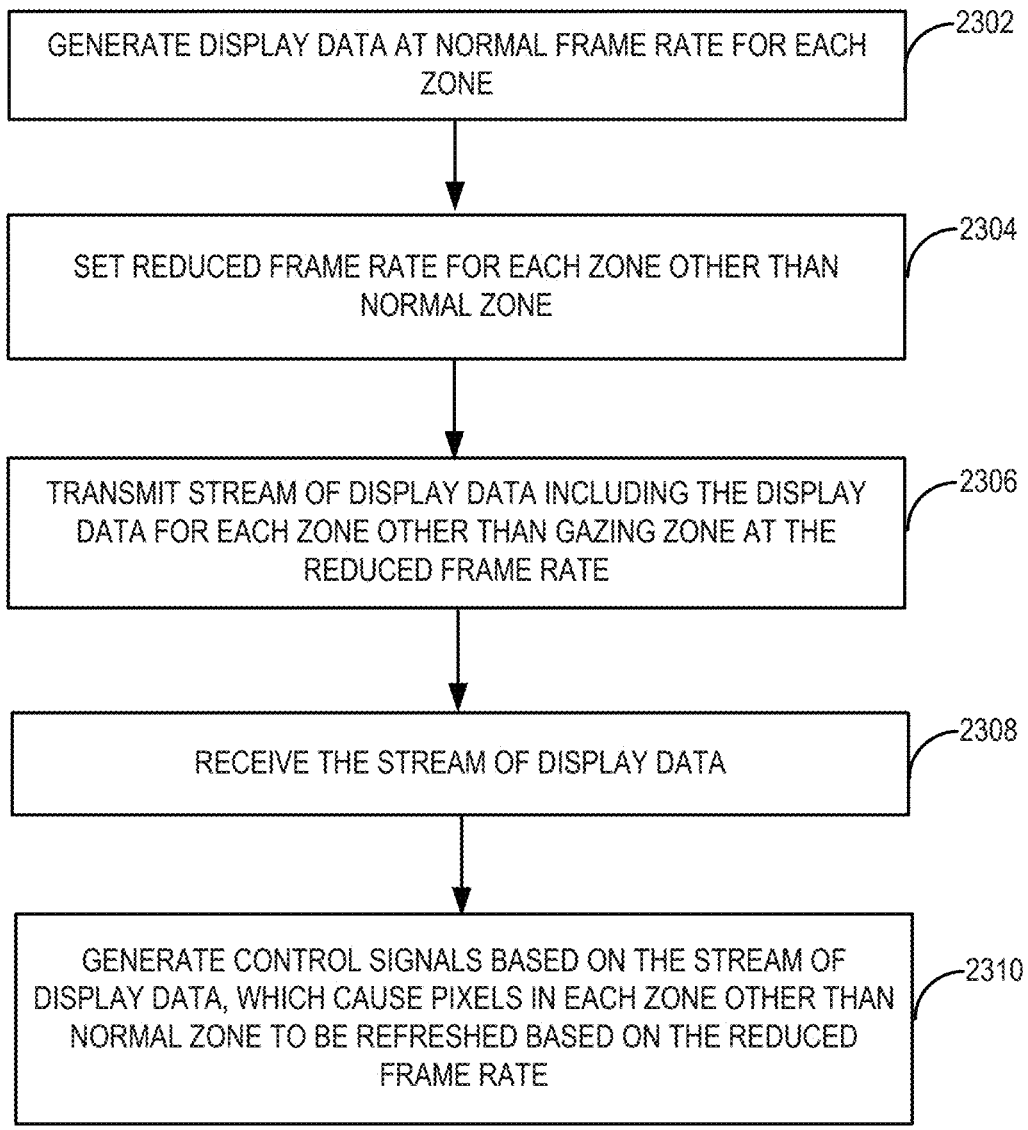
FIG. 23 is a flow chart of another method for providing display data and control signals for driving a display having an array of pixels divided into a plurality of zones in accordance with an embodiment.

FIG. 23 is a flow chart of another method for providing display data and control signals for driving a display having an array of pixels divided into a plurality of zones in accordance with an embodiment. It will be described with reference to the above figures. However, any suitable circuit, logic, unit, or module may be employed. The method can be performed by any suitable circuit, logic, unit, or module that can comprise hardware (e.g., circuitry, dedicated logic, programmable logic, microcode, etc.), software (e.g., instructions executing on a processing device), firmware, or a combination thereof. It is to be appreciated that not all steps may be needed to perform the disclosure provided herein. Further, some of the steps may be performed simultaneously, or in a different order than shown in FIG. 23, as will be understood by a person of ordinary skill in the art.

Starting at 2302, a set of display data is generated at a normal frame rate for each zone of the plurality of zones. This may be performed by graphics pipelines 604 of processor 114. At 2304, a reduced frame rate lower than the normal frame rate at which the corresponding set of display data is generated is set for each zone other than the normal zone. This may be performed by pre-processing module 608 of processor 114. At 2306, a stream of display data including the sets of display data for each zone other than the gazing zone is transmitted. Each set of display data for the respective zone is transmitted at the corresponding reduced frame rate. This may be performed by data transmitter 610 of processor 114.

Proceeding to 2308, the stream of display data including the sets of display data transmitted at 2306 is received. This may be performed by data receiver 612 of control logic 104. At 2310, control signals are generated based on the stream of display data. The control signals cause the pixels in each zone other than the normal zone to be refreshed based on the corresponding reduced frame rate. This may be performed by post-processing module 614 of control logic 104.

Figure 24:
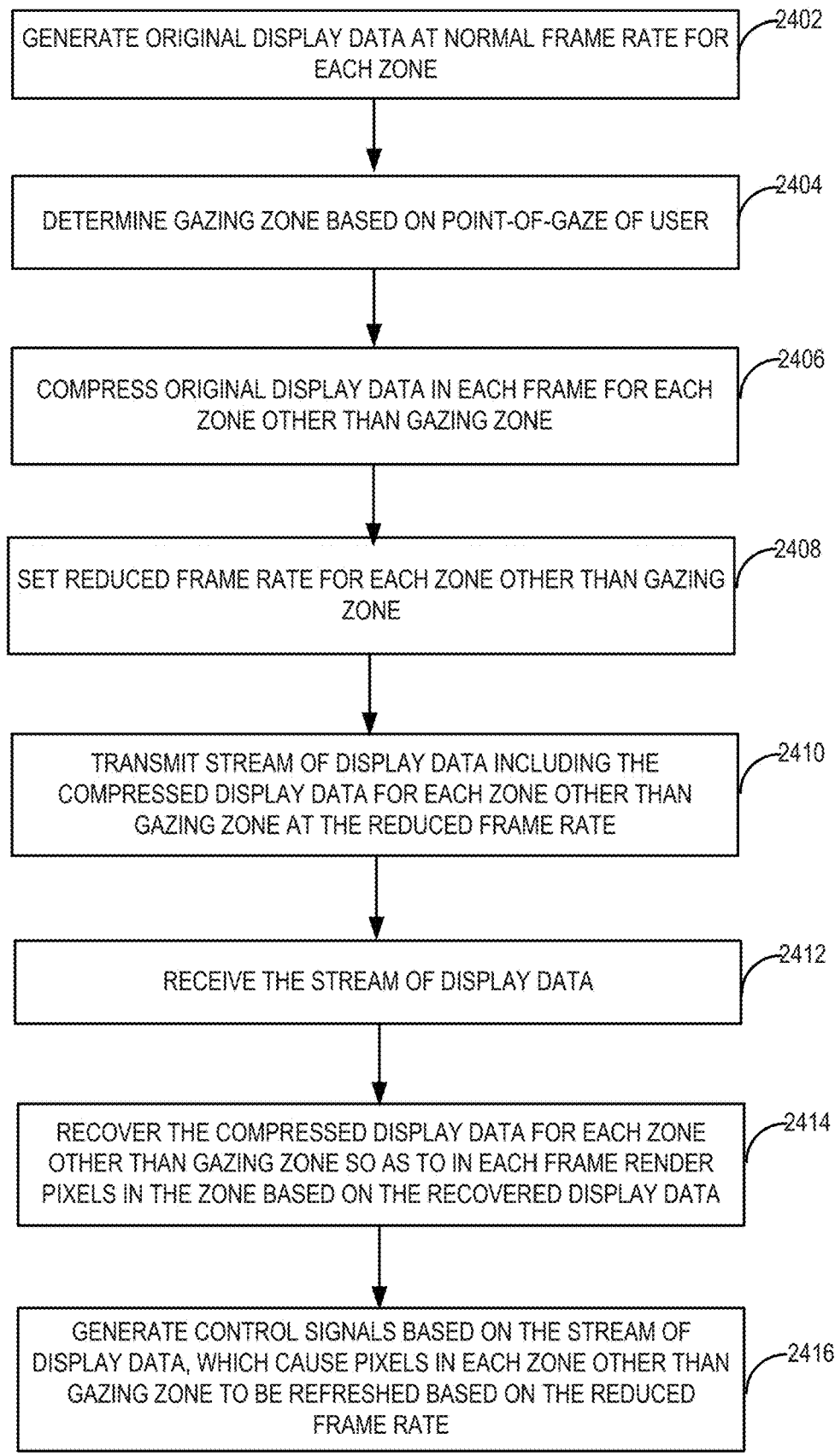
FIG. 24 is a flow chart of still another method for providing display data and control signals for driving a display having an array of pixels divided into a plurality of zones in accordance with an embodiment.

FIG. 24 is a flow chart of still another method for providing display data and control signals for driving a display having an array of pixels divided into a plurality of zones in accordance with an embodiment. It will be described with reference to the above figures. However, any suitable circuit, logic, unit, or module may be employed. The method can be performed by any suitable circuit, logic, unit, or module that can comprise hardware (e.g., circuitry, dedicated logic, programmable logic, microcode, etc.), software (e.g., instructions executing on a processing device), firmware, or a combination thereof. It is to be appreciated that not all steps may be needed to perform the disclosure provided herein. Further, some of the steps may be performed simultaneously, or in a different order than shown in FIG. 24, as will be understood by a person of ordinary skill in the art.

Starting at 2402, a set of original display data is generated in each frame at a normal frame rate for each zone of the plurality of zones. This may be performed by graphics pipelines 604 of processor 114. At 2404, a gazing zone is determined based on a point-of-gaze of the user. This may be performed by tracking module 606 of processor 114. At 2406, the set of original display data in each frame for each zone other than the gazing zone is compressed to reduce the amount of display data in the set of original display data in each frame. The compression of display data may be achieved by down-sampling, data compression, and/or data truncation. At 2408, a reduced frame rate lower than the normal frame rate at which the corresponding set of original display data is generated is set for each zone other than the gazing zone. 2406 and 2408 may be performed by pre-processing module 608 of processor 114. At 2410, a stream of display data including the sets of compressed display data for each zone other than the gazing zone is transmitted. Each set of compressed display data is transmitted at the corresponding reduced frame rate. This may be performed by data transmitter 610 of processor 114.

Proceeding to 2412, the stream of display data including the sets of compressed display data transmitted at 2410 is received. This may be performed by data receiver 612 of control logic 104. At 2414, the set of compressed display data for each zone other than the gazing zone is recovered so as to, in each frame, render the pixels in the respective zone based on the corresponding set of recovered display data. At 2416, control signals are generated based on the stream of display data. The control signals cause the pixels in each zone other than the gazing zone to be refreshed based on the corresponding reduced frame rate. 2414 and 2416 may be performed by post-processing module 614 of control logic 104.

Also, integrated circuit design systems (e.g. work stations) are known that create wafers with integrated circuits based on executable instructions stored on a computer-readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, units, and circuits described herein may also be produced as integrated circuits by such systems using the computer-readable medium with instructions stored therein.

For example, an integrated circuit with the aforedescribed logic, units, and circuits may be created using such integrated circuit fabrication systems. The computer-readable medium stores instructions executable by one or more integrated circuit design systems that causes the one or more integrated circuit design systems to design an integrated circuit. In one example, the designed integrated circuit includes a graphics pipeline, a tracking module, a pre-processing module, and a data transmitter. The graphics pipeline is configured to, for each of a plurality of zones divided from an array of pixels on a display, generate a set of original display data in each frame. The tracking module is configured to determine a gazing zone of the plurality of zones based, at least in part, on a point-of-gaze of a user. The pre-processing module is configured to, for each of the plurality of zones other than the gazing zone, compress the corresponding set of original display data in each frame to reduce an amount of data in the set of original display data in each frame. The data transmitter is configured to transmit, to control logic operatively coupled to the display, in each frame, a stream of display data comprising the one or more sets of compressed display data for each zone other than the gazing zone.

In another example, the designed integrated circuit includes a graphics pipeline, a pre-processing module, and a data transmitter. The graphics pipeline is configured to, for each of a plurality of zones divided from an array of pixels on a display, generate a set of display data at a normal frame rate. The pre-processing module is configured to, for each of the plurality of zones other than a normal zone, set a reduced frame rate lower than the normal frame rate at which the corresponding set of display data is generated. The data transmitter is configured to transmit, to control logic operatively coupled to the display, a stream of display data comprising the one or more sets of display data for each zone other than the normal zone. Each set of display data for the zone other than the normal zone is transmitted at the corresponding reduced frame rate.

In still another example, the designed integrated circuit includes a graphics pipeline, a tracking module, a pre-processing module, and a data transmitter. The graphics pipeline is configured to, for each of a plurality of zones divided from an array of pixels on a display, generate a set of original display data in each frame at a normal frame rate. The tracking module is configured to determine a gazing zone of the plurality of zones based, at least in part, on a point-of-gaze of a user. The pre-processing module is configured to, for each of the plurality of zones other than the gazing zone, compress the corresponding set of original display data in each frame to reduce an amount of data in the set of original display data in each frame, and set a reduced frame rate lower than the normal frame rate at which the corresponding set of original display data is generated. The data transmitter is configured to transmit, to control logic operatively coupled to the display, a stream of display data comprising, in each frame, the one or more sets of compressed display data for each zone other than the gazing zone. Each set of compressed display data for the zone other than the gazing zone is transmitted at the corresponding reduced frame rate.

The above detailed description of the disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A system for display, comprising:
   a display having an array of pixels divided into a plurality of zones; a processor, comprising:
   a graphics pipeline configured to, for each of the plurality of zones, generate a set of original display data in each frame,
   a tracking module configured to determine a gazing zone of the plurality of zones based, at least in part, on a point-of-gaze of a user,
   a pre-processing module configured to, for each of the plurality of zones other than the gazing zone, compress the corresponding set of original display data in each frame to reduce an amount of data in the set of original display data in each frame, and
   a data transmitter configured to transmit, in each frame, a stream of display data comprising the one or more sets of compressed display data for each zone other than the gazing zone; and
   control logic operatively coupled to the display and the processor and configured to provide control signals for driving the display, the control logic comprising:
   a data receiver configured to receive from the data transmitter, in each frame, the stream of display data, and
   a post-processing module configured to, for each zone other than the gazing zone, recover the corresponding set of compressed display data so as to, in each frame, render the pixels in each zone other than the gazing zone based, at least in part, on the corresponding set of recovered display data,
   wherein the tracking module of the processor is further configured to determine whether motion of the user exceeds a threshold; in response to the tracking module determines that the motion of the user does not exceed the threshold, the pre-processing module of the processor is further configured to compress the set of original display data in each frame for the gazing zone to reduce an amount of data in the set of original display data in each frame; the data transmitter of the processor is further configured to transmit, in each frame, the stream of display data comprising the set of compressed display data for the gazing zone; and the post-processing module of the control loqic is further configured to, for each zone other than the gazing zone, recover the set of compressed display data for the gazing zone so as to, in each frame, render the pixels in the gazing zone based, at least in part, on the set of recovered display data for the gazing zone.

2. The system of claim 1, wherein the gazing zone is in a substantially circular shape.

3. The system of claim 2, wherein at least one of the plurality of zones other than the gazing zone is in a substantially ring shape.

4. The system of claim 1, wherein the division of the array of pixels into the plurality of zones is dynamically determined based, at least in part, on motion of the user.

5. The system of claim 1, wherein the pre-processing module of the processor is further configured to compress the set of original display data for a first zone other than the gazing zone using a first approach and compress the set of original display data for a second zone other than the gazing zone using a second approach different from the first approach.

6. The system of claim 5, wherein each of the first and second approaches comprises at least one of down-sampling, data compression, and data truncation.

7. The system of claim 1, wherein the data receiver of the control logic is further configured to receive first information related to the division of the array of pixels into the plurality of zones and second information related to the compression of the sets of original display data for each zone other than the gazing zone.

8. The system of claim 1, wherein the data transmitter of the processor transmits the stream of display data to the data receiver of the control module via a display interface.

9. The system of claim 1, wherein
the tracking module of the processor is further configured to determine whether motion of the user exceeds a threshold;
in response to the tracking module determines that the motion of the user exceeds the threshold, the data transmitter of the processor is further configured to transmit, in each frame, the stream of display data comprising the set of original display data for the gazing zone; and
in each frame, the pixels in the gazing zone are rendered based, at least in part, on the set of original display data for the gazing zone.

10. An apparatus, comprising:
a display having an array of pixels divided into a plurality of zones; and control logic operatively coupled to the display and configured to provide control signals for driving the display, the control logic comprising:
a data receiver configured to receive, in each frame, a stream of display data comprising one or more sets of compressed display data for each of the plurality of zones other than a gazing zone, wherein
the gazing zone is determined based, at least in part, on a point-of-gaze of a user, and each set of compressed display data is generated by a processor by compressing a set of original display data for the corresponding zone other than the gazing zone, and a post-processing module configured to, for each zone other than the gazing zone, recover the corresponding set of compressed display data so as to, in each frame, render the pixels in each zone other than the gazing zone based, at least in part, on the corresponding set of recovered display data,
wherein the tracking module of the processor is further configured to determine whether motion of the user exceeds a threshold; in response to the tracking module determines that the motion of the user does not exceed the threshold, the pre-processing module of the processor is further configured to compress the set of original display data in each frame for the gazing zone to reduce an amount of data in the set of original display data in each frame; the data transmitter of the processor is further configured to transmit, in each frame, the stream of display data comprising the set of compressed display data for the gazing zone; and the post-processing module of the control logic is further configured to, for each zone other than the gazing zone, recover the set of compressed display data for the gazing zone so as to, in each frame, render the pixels in the gazing zone based, at least in part, on the set of recovered display data for the gazing zone.

11. An apparatus, comprising:
a graphics pipeline configured to, for each of a plurality of zones divided from an array of pixels on a display, generate a set of original display data in each frame;
a tracking module configured to determine a gazing zone of the plurality of zones based, at least in part, on a point-of-gaze of a user;
a pre-processing module configured to, for each of the plurality of zones other than the gazing zone, compress the corresponding set of original display data in each frame to reduce an amount of data in the set of original display data in each frame; and
a data transmitter configured to transmit, to control logic operatively coupled to the display, in each frame, a stream of display data comprising the one or more sets of compressed display data for each zone other than the gazing zone,
wherein the tracking module of the processor is further configured to determine whether motion of the user exceeds a threshold; in response to the tracking module determines that the motion of the user does not exceed the threshold, the pre-processing module of the processor is further configured to compress the set of original display data in each frame for the gazing zone to reduce an amount of data in the set of original display data in each frame; the data transmitter of the processor is further configured to transmit, in each frame, the stream of display data comprising the set of compressed display data for the gazing zone; and the post-processing module of the control logic is further configured to, for each zone other than the gazing zone, recover the set of compressed display data for the gazing zone so as to, in each frame, render the pixels in the gazing zone based, at least in part, on the set of recovered display data for the gazing zone.

12. A system for display, comprising:
a display having an array of pixels divided into a plurality of zones; a processor, comprising:
a graphics pipeline configured to, for each of the plurality of zones, generate a set of display data at a normal frame rate,
a pre-processing module configured to, for each of the plurality of zones other than a normal zone, set a reduced frame rate lower than the normal frame rate at which the corresponding set of display data is generated, and
a data transmitter configured to transmit a stream of display data comprising the one or more sets of display data for each zone other than the normal zone, wherein each set of display data for the zone other than the normal zone is transmitted at the corresponding reduced frame rate; and
control logic operatively coupled to the display and the processor and configured to provide control signals for driving the display, the control logic comprising:
a data receiver configured to receive, from the data transmitter, the stream of display data, and
a post-processing module configured to generate the control signals based, at least in part, on the received stream of display data, wherein the control signals cause the pixels in each zone other than the normal zone to be refreshed based, at least in part, on the corresponding reduced frame rate,
wherein the tracking module of the processor is further configured to determine whether motion of the user exceeds a threshold; in response to the tracking module determines that the motion of the user does not exceed the threshold, the pre-processing module of the processor is further configured to, for the normal zone, set a reduced frame rate lower than the normal frame rate; the data transmitter of the processor is further configured to transmit the stream of display data comprising the set of display data for the normal zone, wherein the set of display data for the normal zone is transmitted at the reduced frame rate for the normal zone; and the post-processing module of the control logic is further configured to qenerate the control siqnals based, at least in part, on the received stream of display data, wherein the control signals further cause the pixels in the normal zone to be refreshed based, at least in part, on the reduced frame rate for the normal zone.

13. The system of claim 12, wherein the processor further comprises:
a tracking module configured to determine the normal zone of the plurality of zones based, at least in part, on a point-of-gaze of a user.

14. The system of claim 12, wherein
the tracking module of the processor is further configured to determine whether motion of the user exceeds a threshold;
in response to the tracking module determines that the motion of the user exceeds the threshold, the data transmitter of the processor is further configured to transmit the stream of display data comprising the set of display data for the normal zone, wherein the set of display data for the normal zone is transmitted at the normal frame rate; and
the post-processing module of the control logic is further configured to generate the control signals based, at least in part, on the received stream of display data, wherein the control signals further cause the pixels in the normal zone to be refreshed based, at least in part, on the normal frame rate.

15. The system of claim 12, wherein the normal zone comprises pixels in at least one entire row of the array of pixels.

16. The system of claim 12, wherein the normal zone is in a substantially circular shape.

17. The system of claim 16, wherein at least one of the plurality of zones other than the normal zone is in a substantially ring shape.

18. The system of claim 12, wherein the division of the array of pixels into the plurality of zones is dynamically determined based, at least in part, on motion of a user.

19. The system of claim 12, wherein the pre-processing module of the processor is further configured to set a first reduced frame rate for a first zone other than the normal zone and set a second reduced frame rate different from the first reduced frame rate for a second zone other than the normal zone.

20. The system of claim 12, wherein the control signals cause the pixels in each zone other than the normal zone to be refreshed once the corresponding set of display data is received.

21. The system of claim 12, wherein the control signals cause the pixels in each zone other than the normal zone to be refreshed once the sets of display data for all the zones other than the normal zone are received.

22. The system of claim 14, wherein
the control signals cause the pixels of odd rows in the normal zone to be refreshed in a first sub-frame of each frame and cause the pixels of even rows in the normal zone to be refreshed in a second sub-frame of each frame; and
the control signals cause the pixels of odd rows in each zone other than the normal zone to be refreshed in the first sub-frame of each alternate frame and cause the pixels of even rows in each zone other than the normal zone to be refreshed in the second sub-frame of each another alternate frame.

23. The system of claim 14, wherein the control signals cause the pixels in the normal zone to be scanned at the normal frame rate and cause the set of display data for the normal zone to be written to the pixels in the normal zone at the normal frame rate.

24. The system of claim 23, wherein the control signals cause the pixels in each zone other than the normal zone to be scanned at the corresponding reduced frame rate and cause the corresponding set of display data for each zone other than the normal zone to be written to the pixels in the zone other than the normal zone at the corresponding reduced frame rate.

25. The system of claim 23, wherein the control signals cause the pixels in each zone other than the normal zone to be scanned at the normal frame rate and cause the corresponding set of display data for each zone other than the normal zone to be written to the pixels in the zone other than the normal zone at the corresponding reduced frame rate.

26. The system of claim 12, wherein the control signals cause the pixels in the normal zone to be scanned at the reduced frame rate and cause the set of display data for the normal zone to be written to the pixels in the normal zone at the reduced frame rate.

27. The system of claim 12, wherein the data receiver of the control logic is further configured to receive first information related to the division of the array of pixels into the plurality of zones and second information related to the setting of the reduced frame rates for each zone other than the normal zone.

28. The system of claim 12, wherein the data transmitter of the processor transmits the stream of display data to the data receiver of the control module via a display interface.

* * * * *